US008151489B2

(12) United States Patent
Marvin et al.

(10) Patent No.: US 8,151,489 B2
(45) Date of Patent: Apr. 10, 2012

(54) SHOE HAVING AN INFLATABLE BLADDER

(75) Inventors: William Marvin, Brighton, MA (US);
Paul M. Davis, Blackstone, MA (US);
Geoff Swales, Somerset, MA (US); Paul E. Litchfield, Westboro, MA (US)

(73) Assignee: Reebok International Ltd., Canton, MA (US)

( * ) Notice: Subject to any disclaimer, the term of this patent is extended or adjusted under 35 U.S.C. 154(b) by 0 days.

(21) Appl. No.: 12/757,278

(22) Filed: Apr. 9, 2010

(65) Prior Publication Data

US 2010/0192410 A1    Aug. 5, 2010

Related U.S. Application Data

(60) Continuation of application No. 11/969,534, filed on Jan. 4, 2008, now Pat. No. 7,721,465, which is a division of application No. 11/260,255, filed on Oct. 28, 2005, now Pat. No. 7,337,560, which is a continuation of application No. 10/610,644, filed on Jul. 2, 2003, now Pat. No. 7,047,670, which is a continuation-in-part of application No. 10/186,717, filed on Jul. 2, 2002, now Pat. No. 6,785,985.

(51) Int. Cl.
*A43B 23/00* (2006.01)

(52) U.S. Cl. .................................. 36/45; 36/3 A; 36/29

(58) Field of Classification Search .................... 36/3 R, 36/3 A, 45, 29
See application file for complete search history.

(56) References Cited

U.S. PATENT DOCUMENTS

| 82,944 A | 10/1868 | Haskins |
| 167,732 A | 10/1875 | Blanchard |
| 180,819 A | 8/1876 | Ames |
| 212,898 A | 3/1879 | Class |
| 508,034 A | 11/1893 | Moore |
| 510,504 A | 12/1893 | Foster |
| 536,345 A | 3/1895 | Harris |
| 545,705 A | 9/1895 | MacDonald |
| 547,645 A | 10/1895 | LaCroix |

(Continued)

FOREIGN PATENT DOCUMENTS

BR    8305004    9/1983

(Continued)

OTHER PUBLICATIONS

Zonic Product Description, date unknown.

(Continued)

*Primary Examiner* — Marie Patterson
(74) *Attorney, Agent, or Firm* — Sterne, Kessler, Goldstein & Fox P.L.L.C.

(57) ABSTRACT

An article of footwear including a sole and an upper with an exterior and interior surface, and one or more bladders which comprises at least one of the exterior or interior surfaces of the upper. The bladder comprising sheets of polyurethane or polyester film attached together to form an airtight seal. The article of footwear also includes a inflation mechanism for selectively introducing air in the one or more bladders. The inflation mechanism is located under the foot of the wearer to be activated by the normal action of the wearer to inflate the one or more bladders. The article of footwear may also include an assembly for connecting several tubes to one under foot inflation mechanism. The article of footwear may also include inflatable laces that are inflated by an underfoot inflation mechanism.

23 Claims, 22 Drawing Sheets

U.S. PATENT DOCUMENTS

| | | | |
|---|---|---|---|
| 566,422 A | 8/1896 | Singleton | |
| 580,501 A | 4/1897 | Mobberley | |
| 586,155 A | 7/1897 | Bascom | |
| 634,588 A | 10/1899 | Roche | |
| D32,093 S | 1/1900 | Childs | |
| 692,170 A | 1/1902 | Wallerstein et al. | |
| 710,674 A | 10/1902 | Fassmann | |
| 850,327 A | 4/1907 | Tauber | |
| 900,867 A | 10/1908 | Miller | |
| 918,391 A | 4/1909 | Taarud | |
| 950,333 A | 2/1910 | Koch | |
| 1,034,915 A | 8/1912 | Kaiser | |
| 1,053,204 A | 2/1913 | Morrison | |
| 1,059,485 A | 4/1913 | Orlopp | |
| 1,069,001 A | 7/1913 | Guy | |
| 1,071,271 A | 8/1913 | Spangler | |
| 1,145,534 A | 7/1915 | Wetmore | |
| 1,148,376 A | 7/1915 | Gay | |
| 1,193,608 A | 8/1916 | Poulson | |
| 1,198,476 A | 9/1916 | Pearson | |
| 1,216,795 A | 2/1917 | Gause | |
| 1,235,645 A | 8/1917 | Blatz et al. | |
| 1,241,832 A | 10/1917 | Drunkenmiller | |
| 1,257,086 A | 2/1918 | Marcellus | |
| 1,285,695 A | 11/1918 | Harman | |
| 1,304,915 A | 5/1919 | Spinney | |
| 1,322,338 A | 11/1919 | Pitts | |
| 1,328,154 A | 1/1920 | Jackerson | |
| D55,436 S | 6/1920 | Seiders | |
| 1,369,555 A | 2/1921 | Schweinert et al. | |
| 1,383,067 A | 6/1921 | Borman | |
| 1,422,716 A | 7/1922 | Jones | |
| 1,444,189 A | 2/1923 | Key | |
| 1,450,934 A | 4/1923 | Wilson | |
| 1,498,838 A | 6/1924 | Harrison, Jr. | |
| 1,531,731 A | 3/1925 | Burgess | |
| 1,602,675 A | 10/1926 | Hurley | |
| 1,605,985 A | 11/1926 | Rasmussen | |
| 1,630,445 A | 5/1927 | Murray | |
| 1,637,219 A | 7/1927 | Edelmann | |
| 1,776,750 A | 9/1930 | Burns | |
| 1,802,523 A | 4/1931 | Morangier | |
| 1,818,178 A | 8/1931 | Weisberg | |
| 1,869,257 A | 7/1932 | Hitzler | |
| 1,940,542 A | 12/1933 | Goth | |
| 1,954,122 A | 4/1934 | Fiori | |
| 1,979,972 A | 11/1934 | Guild | |
| 2,001,821 A | 5/1935 | Everston | |
| 2,002,527 A | 5/1935 | Dorogi et al. | |
| 2,007,803 A | 7/1935 | Kelly | |
| 2,015,882 A | 10/1935 | Brewer | |
| 2,016,113 A | 10/1935 | Lambert et al. | |
| 2,020,240 A | 11/1935 | Cochran | |
| 2,036,695 A | 4/1936 | Heigis | |
| 2,038,473 A | 4/1936 | Bronson | |
| 2,052,753 A * | 9/1936 | Daniels | 12/146 R |
| 2,070,116 A | 2/1937 | Cutillo | |
| 2,074,286 A | 3/1937 | Sullivan | |
| 2,080,469 A | 5/1937 | Gilbert | |
| 2,080,499 A | 5/1937 | Nathansohn | |
| 2,082,309 A * | 6/1937 | Turiansky | 36/3 A |
| 2,097,451 A * | 11/1937 | Daniels | 12/146 R |
| 2,118,255 A * | 5/1938 | Loucks et al. | 36/3 |
| 2,147,197 A * | 2/1939 | Glidden | 36/9 R |
| 2,177,116 A | 10/1939 | Persichino | |
| 2,205,938 A | 6/1940 | Ward | |
| 2,275,720 A | 3/1942 | Bingham, Jr. | |
| D133,459 S | 8/1942 | Corley | |
| 2,325,639 A | 8/1943 | Stritter | |
| 2,350,879 A * | 6/1944 | Daniels | 36/45 |
| 2,368,091 A | 1/1945 | Andersen | |
| 2,476,545 A | 7/1949 | Hayward | |
| 2,488,382 A | 11/1949 | Davis | |
| 2,498,596 A | 2/1950 | Wallach | |
| 2,532,742 A | 12/1950 | Stoiner | |
| 2,533,685 A | 12/1950 | Nurkiewicz | |
| D164,847 S * | 10/1951 | Dronoff | D2/971 |
| 2,574,028 A | 11/1951 | Fields et al. | |
| 2,575,908 A | 11/1951 | Clifford | |
| 2,579,977 A | 12/1951 | Sjolin | |
| 2,600,239 A | 6/1952 | Gilbert | |
| 2,605,560 A | 8/1952 | Gouabault | |
| 2,622,052 A | 12/1952 | Chandler | |
| 2,638,690 A | 5/1953 | Bullard, III | |
| 2,677,904 A | 5/1954 | Reed | |
| 2,677,906 A | 5/1954 | Reed | |
| 2,678,506 A | 5/1954 | Baroumes | |
| 2,682,712 A | 8/1954 | Cooksley | |
| 2,686,081 A | 8/1954 | Cooksley | |
| 2,693,221 A | 11/1954 | Lyijynen | |
| 2,698,490 A | 1/1955 | Goldman | |
| 2,717,100 A | 9/1955 | Engelder | |
| 2,717,556 A | 9/1955 | Bartoo | |
| 2,762,134 A | 9/1956 | Town | |
| 2,774,152 A | 12/1956 | Alber | |
| 2,775,401 A | 12/1956 | Storrs | |
| 2,845,032 A | 7/1958 | Krohm | |
| 2,860,634 A | 11/1958 | Duncan et al. | |
| 2,863,230 A | 12/1958 | Cortina | |
| 2,878,683 A | 3/1959 | Huthsing, Sr., et al. | |
| 2,942,614 A | 6/1960 | Lardner | |
| 2,949,927 A | 8/1960 | Mackel | |
| 2,981,010 A | 4/1961 | Aaskov | |
| 2,982,448 A | 5/1961 | Leonard et al. | |
| 3,015,414 A | 1/1962 | Wilson | |
| 3,027,659 A | 4/1962 | Gianola | |
| 3,044,190 A | 7/1962 | Urbany | |
| 3,060,965 A | 10/1962 | Taggart | |
| 3,062,152 A | 11/1962 | Huff, Sr. | |
| 3,068,494 A | 12/1962 | Pinkwater | |
| 3,078,679 A | 2/1963 | Mortimer et al. | |
| 3,080,094 A | 3/1963 | Modderno | |
| 3,120,712 A | 2/1964 | Menken | |
| 3,180,039 A | 4/1965 | Burns, Jr. | |
| D201,606 S | 7/1965 | McCord | |
| 3,196,062 A | 7/1965 | Kristal | |
| 3,211,164 A | 10/1965 | Bender et al. | |
| 3,221,932 A | 12/1965 | Anderson | |
| 3,225,463 A | 12/1965 | Burnham | |
| 3,245,428 A | 4/1966 | Klimak et al. | |
| 3,256,131 A | 6/1966 | Koch et al. | |
| D205,276 S | 7/1966 | Kort | |
| 3,273,263 A | 9/1966 | Klima | |
| 3,329,983 A | 7/1967 | Clamp | |
| 3,331,146 A | 7/1967 | Karras | |
| 3,372,495 A | 3/1968 | Finn | |
| 3,397,418 A | 8/1968 | Steadman et al. | |
| 3,410,004 A | 11/1968 | Finn | |
| 3,426,787 A | 2/1969 | Fuller | |
| 3,454,033 A | 7/1969 | Smith | |
| 3,484,881 A | 12/1969 | Krieger | |
| D216,694 S | 3/1970 | Lause | |
| 3,548,869 A | 12/1970 | Weise et al. | |
| 3,586,003 A | 6/1971 | Baker | |
| D221,432 S | 8/1971 | Dunlap | |
| 3,628,531 A | 12/1971 | Harris | |
| 3,642,563 A | 2/1972 | Davis et al. | |
| 3,658,208 A | 4/1972 | Hansen | |
| 3,664,043 A | 5/1972 | Polumbus, Jr. | |
| 3,685,176 A | 8/1972 | Rudy | |
| 3,716,930 A | 2/1973 | Brahm | |
| 3,721,265 A | 3/1973 | Hoffland | |
| 3,739,414 A | 6/1973 | Skelham | |
| D227,888 S | 7/1973 | Felix | |
| 3,744,159 A | 7/1973 | Nishimura | |
| 3,760,056 A | 9/1973 | Rudy | |
| 3,765,422 A | 10/1973 | Smith | |
| 3,776,227 A | 12/1973 | Pitesky et al. | |
| 3,791,375 A | 2/1974 | Pfeiffer | |
| 3,834,433 A | 9/1974 | Thompson | |
| 3,854,228 A | 12/1974 | Conroy | |
| 3,871,117 A | 3/1975 | Richmond et al. | |
| 3,888,242 A | 6/1975 | Harris et al. | |
| 3,931,685 A | 1/1976 | Laukaitis | |
| 3,973,336 A | 8/1976 | Ahn | |
| 3,976,096 A | 8/1976 | Kass et al. | |
| 3,983,907 A | 10/1976 | Sorensen | |

| | | |
|---|---|---|
| 3,985,155 A | 10/1976 | Nightingale |
| 3,993,099 A | 11/1976 | Nightingale |
| 3,995,653 A | 12/1976 | Mackal et al. |
| 3,996,957 A | 12/1976 | Goldish et al. |
| D243,457 S | 2/1977 | Ryan |
| 4,014,048 A | 3/1977 | Rappleyea |
| 4,039,039 A | 8/1977 | Gottfried |
| 4,044,867 A | 8/1977 | Fisher |
| 4,054,163 A | 10/1977 | Brown, Jr. et al. |
| D246,486 S | 11/1977 | Nickel |
| 4,069,602 A | 1/1978 | Kremer et al. |
| 4,078,322 A | 3/1978 | Dalebout |
| 4,083,127 A | 4/1978 | Hanson |
| 4,088,147 A | 5/1978 | Krechel et al. |
| 4,100,686 A | 7/1978 | Sgarlato et al. |
| 4,106,222 A | 8/1978 | Houck |
| D249,279 S | 9/1978 | Backlund |
| 4,123,855 A | 11/1978 | Thedford |
| 4,129,951 A | 12/1978 | Petrosky |
| D252,703 S | 8/1979 | Cupit |
| 4,168,015 A | 9/1979 | Robinette |
| 4,169,353 A | 10/1979 | Fresard |
| 4,183,156 A | 1/1980 | Rudy |
| 4,217,705 A | 8/1980 | Donzis |
| 4,219,945 A | 9/1980 | Rudy |
| 4,222,183 A * | 9/1980 | Haddox .................. 36/114 |
| 4,232,459 A | 11/1980 | Vaccari |
| 4,271,606 A | 6/1981 | Rudy |
| 4,297,755 A | 11/1981 | Mollura |
| 4,316,334 A | 2/1982 | Hunt |
| 4,316,335 A | 2/1982 | Giese et al. |
| 4,335,530 A | 6/1982 | Stubblefield |
| 4,340,626 A | 7/1982 | Rudy |
| 4,342,157 A | 8/1982 | Gilbert |
| 4,361,969 A | 12/1982 | Vermonet |
| 4,370,997 A | 2/1983 | Braithwaite et al. |
| 4,372,297 A | 2/1983 | Perlin |
| 4,397,104 A | 8/1983 | Doak |
| 4,398,357 A | 8/1983 | Batra |
| 4,399,621 A | 8/1983 | Dassler |
| 4,417,407 A | 11/1983 | Fukuoka |
| 4,439,937 A | 4/1984 | Daswick |
| 4,446,634 A | 5/1984 | Johnson et al. |
| 4,447,967 A * | 5/1984 | Zaino .................. 36/45 |
| 4,454,662 A | 6/1984 | Stubblefield |
| 4,457,335 A | 7/1984 | Trick |
| 4,458,429 A * | 7/1984 | Schmid .................. 36/3 A |
| 4,458,430 A | 7/1984 | Peterson |
| 4,462,171 A | 7/1984 | Whispell |
| 4,485,568 A | 12/1984 | Landi et al. |
| 4,489,855 A | 12/1984 | Boetger |
| 4,490,928 A | 1/1985 | Kawashima |
| 4,506,695 A | 3/1985 | Kuypers |
| 4,508,582 A | 4/1985 | Fink |
| 4,535,554 A | 8/1985 | De Obaldia |
| 4,541,186 A | 9/1985 | Mulvihill |
| 4,542,598 A | 9/1985 | Misevich et al. |
| 4,546,559 A | 10/1985 | Dassler |
| 4,547,979 A | 10/1985 | Harada et al. |
| D281,350 S | 11/1985 | Heier |
| 4,550,510 A | 11/1985 | Stubblefield |
| 4,571,853 A | 2/1986 | Medrano |
| 4,571,995 A | 2/1986 | Timme |
| 4,578,883 A | 4/1986 | Dassler |
| 4,579,141 A | 4/1986 | Arff |
| D284,264 S | 6/1986 | Resan |
| D284,265 S | 6/1986 | Resan |
| D285,716 S | 9/1986 | Bova |
| 4,608,769 A | 9/1986 | Sturlaugson |
| 4,610,099 A | 9/1986 | Signori |
| 4,628,945 A | 12/1986 | Johnson, Jr. |
| 4,641,438 A | 2/1987 | Laird et al. |
| 4,642,917 A | 2/1987 | Ungar |
| 4,649,552 A | 3/1987 | Yukawa |
| 4,651,445 A | 3/1987 | Hannibal |
| 4,654,986 A | 4/1987 | George |
| 4,658,869 A | 4/1987 | Soon-Fu |
| 4,662,087 A | 5/1987 | Beuch |
| 4,662,412 A | 5/1987 | Swallert |
| 4,669,498 A | 6/1987 | Hansen |
| 4,670,995 A | 6/1987 | Huang |
| 4,676,010 A | 6/1987 | Cheskin |
| 4,681,148 A | 7/1987 | Decker, Jr. et al. |
| 4,693,021 A * | 9/1987 | Mazzarolo .................. 36/131 |
| 4,694,520 A | 9/1987 | Paul et al. |
| 4,694,591 A | 9/1987 | Banich et al. |
| 4,694,850 A | 9/1987 | Fumino |
| 4,700,403 A | 10/1987 | Vacanti |
| 4,702,022 A | 10/1987 | Porcher |
| D293,964 S * | 2/1988 | Baungratz .................. D2/944 |
| D293,968 S * | 2/1988 | Baungratz .................. D2/939 |
| 4,729,543 A | 3/1988 | Aricha |
| 4,730,403 A | 3/1988 | Walkhoff |
| 4,736,531 A | 4/1988 | Richard |
| 4,742,844 A | 5/1988 | Szlaga |
| 4,744,157 A | 5/1988 | Dubner |
| D296,581 S | 7/1988 | Hattori |
| 4,760,651 A | 8/1988 | Pon-Tzu |
| 4,763,426 A | 8/1988 | Polus et al. |
| 4,771,554 A | 9/1988 | Hannemann |
| 4,773,454 A | 9/1988 | Kroh et al. |
| 4,774,776 A | 10/1988 | Gulli |
| 4,776,110 A | 10/1988 | Shiang |
| 4,778,595 A | 10/1988 | Sable et al. |
| 4,779,359 A | 10/1988 | Famolare, Jr. |
| D299,379 S | 1/1989 | Haggerty et al. |
| 4,805,601 A | 2/1989 | Eischen, Sr. |
| 4,811,497 A | 3/1989 | Merino Ciudad |
| 4,813,158 A * | 3/1989 | Brown .................. 36/114 |
| 4,817,303 A | 4/1989 | Selbiger |
| 4,823,482 A | 4/1989 | Lakic |
| D302,764 S | 8/1989 | Peoples et al. |
| 4,852,274 A | 8/1989 | Wilson |
| 4,854,057 A | 8/1989 | Misevich et al. |
| 4,856,208 A | 8/1989 | Zaccaro |
| RE33,066 E | 9/1989 | Stubblefield |
| 4,874,640 A | 10/1989 | Donzis |
| 4,877,057 A | 10/1989 | Christensen |
| 4,878,300 A | 11/1989 | Bogaty |
| 4,887,367 A | 12/1989 | Mackness et al. |
| 4,906,502 A | 3/1990 | Rudy |
| 4,910,889 A | 3/1990 | Bonaventure et al. |
| 4,912,861 A | 4/1990 | Huang |
| D307,508 S | 5/1990 | Miller et al. |
| 4,922,631 A | 5/1990 | Anderie |
| 4,934,543 A | 6/1990 | Schmidt |
| D309,211 S | 7/1990 | Nakagawa |
| 4,969,493 A | 11/1990 | Lee |
| D314,172 S | 1/1991 | Whitley, II |
| 4,991,317 A | 2/1991 | Lakic |
| 4,995,124 A | 2/1991 | Wridge, Jr. et al. |
| 4,995,173 A | 2/1991 | Spier |
| 4,999,072 A | 3/1991 | Dischler |
| 5,010,661 A | 4/1991 | Chu |
| 5,012,954 A | 5/1991 | Will |
| 5,020,395 A | 6/1991 | Mackey |
| 5,022,565 A | 6/1991 | Sturman et al. |
| 5,025,575 A | 6/1991 | Lakic |
| 5,042,176 A | 8/1991 | Rudy |
| 5,052,130 A | 10/1991 | Barry et al. |
| 5,056,992 A | 10/1991 | Simons et al. |
| 5,060,694 A | 10/1991 | Florida et al. |
| 5,070,829 A | 12/1991 | Guntly et al. |
| 5,074,765 A | 12/1991 | Pekar |
| D323,419 S | 1/1992 | Brown et al. |
| 5,083,320 A | 1/1992 | Halstead |
| 5,083,581 A | 1/1992 | Jaw |
| 5,111,838 A | 5/1992 | Langston |
| 5,113,599 A | 5/1992 | Cohen et al. |
| 5,121,840 A | 6/1992 | Schram |
| D327,769 S | 7/1992 | Serna et al. |
| 5,129,107 A | 7/1992 | Lorenzo |
| 5,129,109 A | 7/1992 | Runckel |
| 5,131,173 A | 7/1992 | Anderie |
| 5,135,025 A | 8/1992 | Mackal |
| D329,733 S | 9/1992 | Miller et al. |
| 5,144,708 A | 9/1992 | Pekar |
| 5,155,864 A | 10/1992 | Walker et al. |

| | | | | | |
|---|---|---|---|---|---|
| 5,155,865 A | 10/1992 | Walker et al. | DE | 2365329 | 9/1974 |
| 5,155,866 A | 10/1992 | Walker et al. | DE | 2456612 | 6/1975 |
| 5,155,927 A | 10/1992 | Bates et al. | DE | 2800359 | 7/1979 |
| 5,158,767 A | 10/1992 | Cohen et al. | DE | 2845824 | 11/1980 |
| 5,181,279 A | 1/1993 | Ross | DE | 3245182 | 5/1983 |
| 5,185,943 A | 2/1993 | Tong et al. | DE | 3205264 | 8/1983 |
| 5,191,727 A | 3/1993 | Barry et al. | DE | 3427644 | 1/1986 |
| 5,195,254 A | 3/1993 | Tyng | DE | 8802338 | 8/1989 |
| 5,230,249 A | 7/1993 | Sasaki et al. | EP | 229273 | 7/1978 |
| 5,234,015 A | 8/1993 | Fumino | EP | 40189 | 11/1981 |
| 5,243,772 A | 9/1993 | Francis et al. | EP | 152401 | 8/1985 |
| 5,253,435 A | 10/1993 | Auger et al. | EP | 184781 | 6/1986 |
| D341,189 S | 11/1993 | Legassie et al. | EP | 352807 | 1/1990 |
| 5,295,313 A | 3/1994 | Lee | EP | 389215 | 9/1990 |
| 5,313,717 A | 5/1994 | Allen et al. | EP | 472110 | 2/1992 |
| 5,317,819 A | 6/1994 | Ellis, III | EP | 629360 | 12/1994 |
| 5,319,866 A | 6/1994 | Foley et al. | EP | 630592 | 12/1994 |
| 5,335,382 A | 8/1994 | Huang | FR | 601166 | 4/1926 |
| 5,343,638 A * | 9/1994 | Legassie et al. ............... 36/29 | FR | 720257 | 2/1932 |
| 5,351,710 A | 10/1994 | Phillips | FR | 1204093 | 1/1960 |
| 5,353,525 A | 10/1994 | Grim | FR | 2026062 | 9/1970 |
| 5,375,345 A | 12/1994 | Djuric | FR | 2180315 | 11/1973 |
| 5,381,607 A | 1/1995 | Sussmann | FR | 2252820 | 6/1975 |
| 5,383,290 A | 1/1995 | Grim | FR | 2356384 | 1/1978 |
| 5,390,430 A | 2/1995 | Fitchmun et al. | FR | 2484215 | 12/1981 |
| 5,392,534 A | 2/1995 | Grim | FR | 2496423 | 6/1982 |
| 5,400,526 A | 3/1995 | Sessa | FR | 2670369 A1 | 6/1992 |
| 5,406,661 A | 4/1995 | Pekar | GB | 14955 | 0/1894 |
| 5,406,719 A | 4/1995 | Potter | GB | 23547 | 0/1900 |
| 5,408,760 A | 4/1995 | Tse et al. | GB | 26637 | 0/1897 |
| 5,444,926 A | 8/1995 | Allen et al. | GB | 288671 | 9/1927 |
| 5,544,429 A | 8/1996 | Ellis, III | GB | 338266 | 6/1930 |
| 5,692,321 A | 12/1997 | Holstine | GB | 520514 | 12/1939 |
| 5,701,687 A | 12/1997 | Schmidt et al. | GB | 817524 | 7/1959 |
| 5,784,807 A | 7/1998 | Pagel | GB | 887832 | 1/1962 |
| 5,806,208 A | 9/1998 | French | GB | 2039717 | 8/1980 |
| 5,826,349 A | 10/1998 | Goss | GB | 2114425 | 8/1983 |
| 5,829,172 A | 11/1998 | Kaneko | GB | 2114869 | 9/1983 |
| 5,832,634 A | 11/1998 | Wong | GB | 2165439 | 4/1986 |
| 5,846,063 A | 12/1998 | Lakic | GB | 2240254 | 7/1991 |
| 5,893,219 A | 4/1999 | Smith et al. | GB | 2271710 | 4/1994 |
| 5,915,820 A | 6/1999 | Kraeuter et al. | JP | 1-164804 | 6/1989 |
| 5,953,835 A | 9/1999 | Kwon | JP | 04-504073 | 7/1992 |
| 5,987,779 A | 11/1999 | Litchfield et al. | JP | 05-508783 | 12/1993 |
| 6,014,823 A | 1/2000 | Lakic | JP | 06-503981 | 5/1994 |
| 6,134,812 A | 10/2000 | Voss | JP | 06-506384 | 7/1994 |
| 6,161,240 A | 12/2000 | Huang | JP | 07-503052 | 3/1995 |
| 6,170,173 B1 | 1/2001 | Caston | TW | 95419 | 2/1988 |
| 6,195,914 B1 | 3/2001 | Otis | WO | WO 87/03789 | 7/1987 |
| 6,553,691 B2 | 4/2003 | Huang | WO | WO 89/10074 | 11/1989 |
| 7,210,249 B2 | 5/2007 | Passke et al. | WO | WO 90/04323 | 5/1990 |
| 7,513,067 B2 * | 4/2009 | Marvin et al. ............... 36/50.1 | WO | WO 91/16830 | 11/1991 |
| 7,540,097 B2 * | 6/2009 | Greene et al. ............... 36/3 | WO | WO 91/18527 | 12/1991 |
| 7,774,884 B2 * | 8/2010 | Greene et al. ............... 12/146 C | WO | WO 93/14659 | 8/1993 |
| 2004/0231190 A1 * | 11/2004 | Seamans ............... 36/11.5 | WO | WO 93/21790 | 11/1993 |
| 2006/0272179 A1 | 12/2006 | Passke et al. | WO | WO 03/000083 A1 | 1/2003 |
| 2007/0151121 A1 * | 7/2007 | Touzov ............... 36/3 R | | | |
| 2007/0180730 A1 * | 8/2007 | Greene et al. ............... 36/3 A | | | |

FOREIGN PATENT DOCUMENTS

| | | |
|---|---|---|
| CA | 1143938 | 11/1982 |
| CA | 1230225 | 3/1986 |
| DE | 352167 | 4/1922 |
| DE | 820869 | 11/1951 |
| DE | 867585 | 2/1953 |
| DE | 917173 | 8/1954 |
| DE | 2005365 | 9/1970 |
| DE | 2321817 | 11/1973 |
| DE | 2308547 | 8/1974 |

OTHER PUBLICATIONS

Superflate by Innovations in Cycling, Inc., Interbike Buyer 1991 International Bicycle Expos, p. 145.
Runner's World, pp. 58-59, 69 and 74 (Apr. 1991).
Running Times, pp. 23 and 26 (Apr. 1991).
Innovations in Cycling, Inc., Interbike Buyer Official Show Guide, 10th Ann. Interbike 1991 Int'l. Bicycle Expo.
Mega MicroBlast $CO_2$ Air Dispenser, Date unknown.
Office Action, dated Dec. 20, 2010 for JP 2007-521535, mailed Dec. 22, 2010, 4 pages with translation.

* cited by examiner

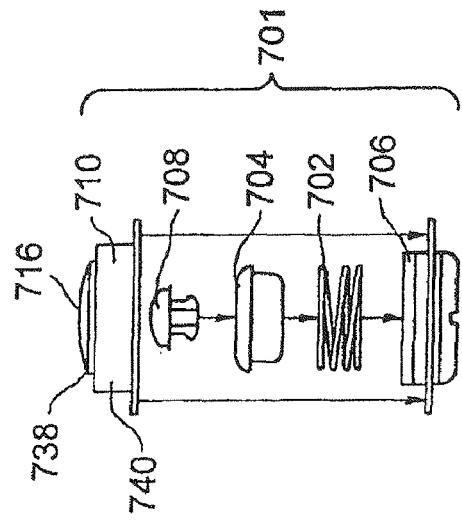
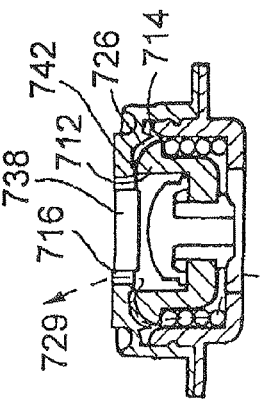
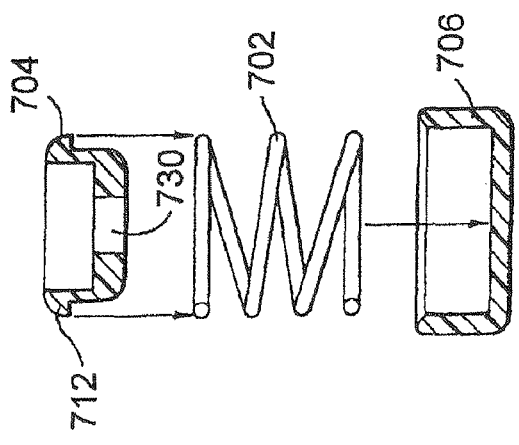
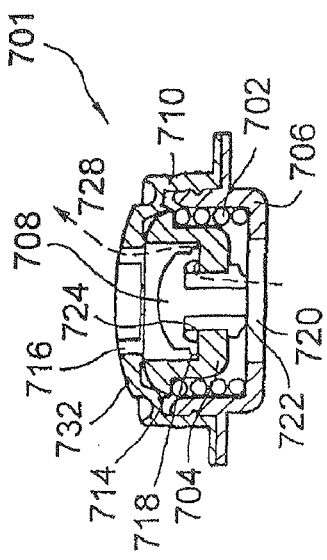

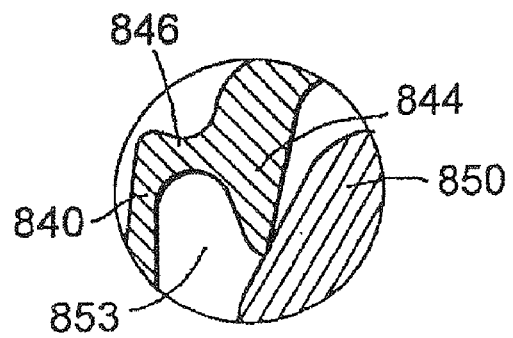
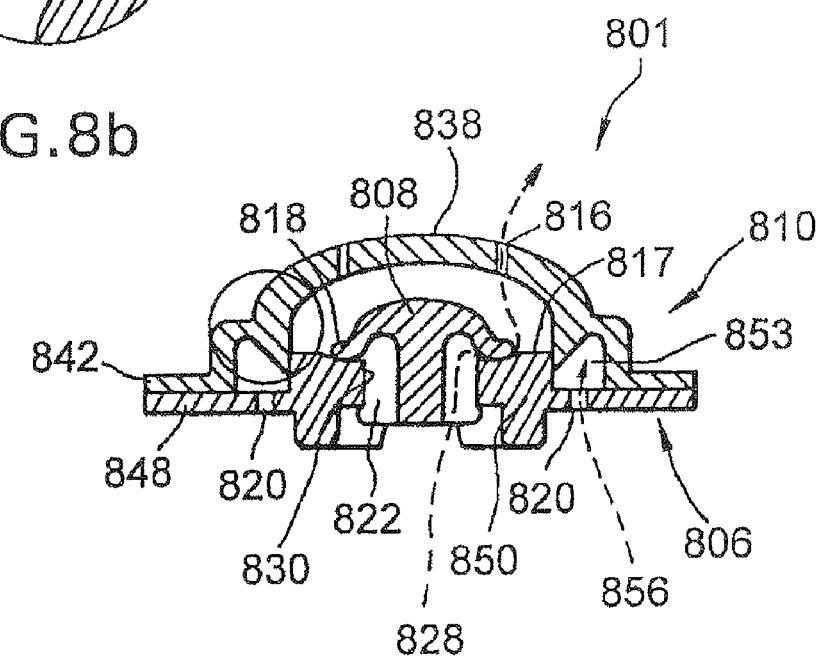
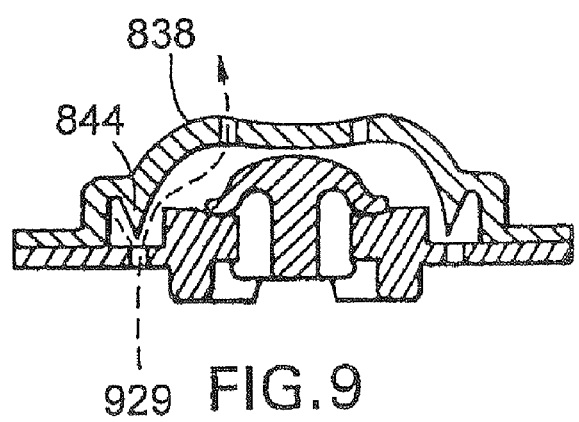

SHOE HAVING AN INFLATABLE BLADDER

BACKGROUND OF THE INVENTION

1. Field of the Invention

This invention relates to footwear, and more particularly to an athletic shoe having an inflatable bladder.

2. Background Art

Athletic footwear must provide stable and comfortable support for the body while subject to various types of stress. It is important that the shoe be comfortable and provide support during various foot movements associated with athletic activity.

Articles of footwear typically include an upper and a sole, and are sold in a variety of sizes according to the length and width of the foot. However, even feet of similar length do not have the same geometry. Therefore, a conventional upper must be adjustable to provide support to various foot contours. Many different products and designs have focused on the need for adjustable upper support. For example, the upper may include an ankle portion which encompasses a portion of the ankle region of the foot and thereby provides support thereto.

In addition, it is well known to adjust the size of a shoe through lacing or through one or more straps reaching across the throat of a typical shoe. Lacing alone, however, suffers from several disadvantages, for example, when the shoe laces or strap is drawn too tightly, the fastening system can cause pressure on the instep of the foot. Such localized pressure is uncomfortable to the wearer and can make it difficult for the shoe to be worn for prolonged periods of time. Furthermore, while lacing allows the upper of the shoe to be adjustable to accommodate varying foot and ankle configurations, it does not mold the shoe to the contour of individual feet. Moreover, there are areas of the foot which are not supported by the upper, due to the irregular contour of the foot. The ski boot industry has often resorted to using inflatable insertable devices to improve the fit of the boots without the pressure caused by lacing. One of the problems associated with shoes has always been striking a balance between support and cushioning. Throughout the course of an average day, the feet and legs of an individual are subjected to substantial impact forces. Running, jumping, walking and even standing exert forces upon the feet and legs of an individual which can lead to soreness, fatigue, and injury. The human foot is a complex and remarkable piece of machinery, capable of withstanding and dissipating many impact forces. The natural padding of fat at the heel and forefoot, as well as the flexibility of the arch, help to cushion the foot. An athlete's stride is partly the result of energy which is stored in the flexible tissues of the foot. For example, during a typical walking or running stride, the achilleas tendon and the arch stretch and contract, storing energy in the tendons and ligaments. When the restrictive pressure on these elements is released, the stored energy is also released, thereby reducing the burden which must be assumed by the muscles. Although the human foot possesses natural cushioning and rebounding characteristics, the foot alone is incapable of effectively overcoming many of the forces encountered during athletic activity. Unless an individual is wearing shoes which provide proper cushioning and support, the soreness and fatigue associated with athletic activity is more acute, and its onset accelerated. This results in discomfort for the wearer which diminishes the incentive for further athletic activity. Equally important, inadequately cushioned footwear can lead to injuries such as blisters, muscle, tendon and ligament damage, and bone stress fractures. Improper footwear can also lead to other ailments, including back pain. In light of the above, numerous attempts have been made over the years to incorporate into a shoe a means for providing improved cushioning and resiliency to the shoe. For example, attempts have been made to enhance the natural elasticity and energy return of the foot with foams such as EVA, which tend to break down over time and lose their resiliency, or with fluid-filled inserts. Fluid filled devices attempt to enhance cushioning and energy return by containing pressurized fluid disposed adjacent the heel and forefoot areas of a shoe. Several overriding problems exist with these devices.

One of these problems is that often fluid filled devices are not adjustable for physiological variances between people and the variety of activities for which athletic shoes are worn. It has been known to adjust fluids in the sole of footwear, such as in U.S. Pat. No. 4,610,099 to Signori. However, under foot devices, while providing cushioning to the sole, typically do not aid in support for the sides, top and back of the foot. Attempts to cushion the upper and sole of a shoe with pressurized air have resulted in products that are either ineffective or, because of the construction techniques used, are too heavy and cumbersome to be used for a running shoe. In some conventional underfoot cushioning systems, the underfoot portion of an inflatable bladder is typically separate from the portions of an inflatable bladder along the sides and top of the foot. Thus, downward pressure in the heel of a conventional cushioning device has no effect on the cushioning surrounding the sides and heel of a foot. Further, conventional inflatable shoe inserts are also designed to be used in conjunction with a conventional shoe upper. A shoe with this type of design can be quite expensive because it requires all the materials of the upper and the additional materials of the inflatable insert. Often the inflatable inserts also add bulk to the shoe because they require a system of complex tubing between the inflation mechanism and the inflatable bladder hidden within several layers of upper padding and material. Most conventional inflatable shoes include either a hand-held inflation mechanism, e.g., that described in Brazilian Patent No. 8305004 to Signori, or an on-board inflation mechanism which is used to selectively inflate only a portion of a shoe. Other inflatable shoes are pre-inflated at the factory. Whether inflated at the factory or inflated by the user, there is a problem with diffusion of air out of the shoe. In the case of shoes inflated at the factory, the problem of diffusion has been partially solved by utilizing a large molecule gas as the fluid for inflating the shoe. While the large molecule gas does not diffuse at the same rate as air, the gas is more expensive which increases the costs of the shoe, and a user is not capable of varying the amount of pressure in the shoe to his individual preferences. Nonetheless, one problem associated with inflation devices in shoes is how to bleed excess air out of an inflated bladder to avoid overinflation.

It is also well known to use an inflatable bladder in the upper of a shoe to accommodate the variation in foot shape. The assignee of the present invention, Reebok International Ltd., popularized such a shoe with its introduction of "The Pump" in the late 1980's, described in U.S. Pat. No. 5,158,767 and incorporated herein by reference. Also in the mid-1980's, Reebok International Ltd. developed a self inflating shoe which is disclosed in U.S. Pat. No. 5,893,219 ("the '219 patent"), which is incorporated herein by reference. Later Reebok International Ltd. introduced a shoe known as the PUMP FURY shoe which utilizes an inflatable exoskeleton to support the upper of a shoe. This shoe is described in U.S. Pat. No. 6,237,251, the disclosure of which is incorporated herein by reference. One of the problems associated with technologically advanced shoes such as the one described in the '219 patent is how to manufacture such shoes at a reasonable cost with as few parts and as little weight as possible. Accordingly, what is needed is a shoe which includes one continuously fluidly interconnected inflatable bladder, wherein fluid may flow between the underside of the foot to the medial and lateral sides of the foot. The footwear must be securely fitted and fastened to the foot of the wearer, whereby a comfortable but secure grip is assured around the ankle and around the instep of the wearer. Further, the bladder in the athletic shoe must be lightweight, inexpensive, self-contained, and easy to use. In addition, the shoe should be easily constructed with minimum required stitching.

BRIEF SUMMARY OF THE INVENTION

The present invention is generally an article of footwear having a sole, and an upper. The upper has an outer surface and an inner surface. At least a portion of either the outer surface or the inner surface or both is formed from an inflatable bladder. The bladder is inflated by an inflation mechanism. The inflation mechanism is located in such a manner that the downward pressure of a user's foot causes the operation of the inflation mechanism. The bladder may be made from two sheets of urethane film which are welded together. Alternatively, the bladder can be formed from a polyester film, such as MYLAR®, or a laminate, such as a film and cloth laminate.

One inflatable bladder includes a sole compartment, a medial compartment, and a lateral compartment. The sole compartment extends under the foot of a wearer and is further divided into at least a first compartment and a second compartment. The first compartment is fluidly connected and adjacent to the medial compartment and the second compartment is fluidly connected to and adjacent the lateral compartment, such that the medial side and lateral side of the bladder are attached under the foot of the wearer. However, the first compartment and the second compartment are not directly fluidly connected and are separated by a periphery weld line. The first compartment and the second compartment are permanently attached under the foot, such as by the use of stitching in the margin of the bladder. Consequently, the bladder forms a continuous cushion running from one side of an inserted foot, under the foot, to a second side of the foot. This bladder further includes a heel portion fluidly connected and adjacent to both the medial compartment and the lateral compartment. The heel portion is permanently attached to the sole compartment, such that the bladder forms a boot surrounding a heel of a foot when it is inserted into a shoe. The first compartment generally includes an arch compartment, while the second compartment generally includes a heel compartment. The second compartment also includes a midfoot compartment, which may be fluidly connected to one of the heel compartment, the medial compartment or the lateral compartment. The second compartment further includes a forefoot compartment, which may also be fluidly connected to one of the midfoot compartment, the medial compartment or the lateral compartment. In another embodiment, the first compartment is a forefoot compartment, and the second compartment includes a heel compartment and a midfoot compartment, such that the midfoot compartment may be fluidly connected to one or more of the heel compartment, the lateral compartment and the medial compartment. An article of footwear of the present invention may include a release valve, which communicates between a bladder and the ambient atmosphere. With the release valve, a user can reduce the amount of air in a bladder manually. Alternatively, an article of footwear may include a check valve, whereby the pressure in a bladder is automatically released. In another embodiment, a combination check valve and release valve may be used in the present invention. A combination check valve and release valve is made from a cap, a seating forming an airtight seal with the cap, and a check valve forming another air-tight seal with the seating. Downward pressure on the cap causes a separation between the seating and the cap releasing the airtight seal between the cap and the seating. In another embodiment, a check valve and a release valve may be side-by-side under the same cap, which is used to activate the release valve.

The underfoot inflation mechanism may define a hole which acts as a one-way valve to enable air to be introduced into said inflation mechanism. Generally, the inflation mechanism is located substantially under the heel of the foot and includes a foam insert to help maintain the volume of the inflation mechanism. More than one underfoot inflation mechanism may be used in the present invention. An underfoot inflation mechanism may be disposed within a cavity formed in the top surface of a foam midsole.

Air may be directed into an underfoot inflation mechanism from an outside location through a tube. The tube has a first end in fluid connection with the inflation mechanism and a second end open to the environment proximal to the article of footwear. The second end of the tube may have access to the environment via a plurality of substantially vertical holes, particular in a cover over the second end of the tube. The tube may be flexible or rigid.

In another embodiment, a shoe of the present invention may include a vamp compartment, a medial heel compartment, and a heel compartment, in which the heel compartment is an underfoot inflation mechanism. In this embodiment, vamp compartment may have a series of cross-hatched channels formed by a plurality of openings defined by a plurality of interior weld lines.

In another embodiment, one or more bladders may be fluidly connected to an underfoot inflation mechanism via a plurality of tubes. Each tube has a first end fluidly connected to one or more bladders and a second end forming an air-tight seal with a channel that is fluidly connected to the inflation mechanism located under the heel of the foot. The article of footwear may include a shank supported by one or more sole pieces. The shank provides support to the shoe sole and bladder. The shank may have cavities that receive the tubes and direct them towards the underfoot inflation mechanism. Tubes may also connect inflation mechanism to two bladders. Alternatively, tubes may connect an underfoot inflation mechanism to a first bladder, while a separate tube connects the first bladder to a second bladder.

A shoe of the present invention may include an underfoot inflation mechanism that inflates a plurality of flexible tubes, that when inflated tighten a conventional upper around a foot inserted therein. Tubes of a shoe of this embodiment have a first end and a second end, both of which form an air-tight seal with a channel that is fluidly connected to an underfoot inflation mechanism. Preferably, at least one tube extends across a vamp area of the article of footwear and at least one tube extends across a heel area of the article of footwear. The present invention is also directed toward an inflatable sockliner. The sockliner has a heel compartment that operates as an underfoot inflation mechanism. The heel compartment of the sockliner may be fluidly connected to several compartments including at least one medial compartment, at least one forefoot compartment, at least one big toe compartment, at least one toe compartment and at least one lateral compartment, defined by a periphery weld line and one or more interior weld lines. The inflatable sockliner also includes a deflation mechanism. Preferably, the deflation mechanism is at least one perforation that opens when pressure within the sockliner reaches a predetermined amount.

BRIEF DESCRIPTION OF THE DRAWINGS/FIGURES

The foregoing and other features and advantages of the present invention will be apparent from the following, more particular description of a preferred embodiment of the invention, as illustrated in the accompanying drawings.

FIG. 7a is an exploded view of the spring mechanism of a blow off valve. FIG. 7b is an exploded view of a combination check valve and release valve. FIG. 7c is a cross section of a combination release valve and check valve. FIG. 7d is a cross section of a combination release valve and check valve with the release valve function operating.

FIG. 8a is cross-sectional view of another combination check valve and release valve of the present invention. FIG. 8b is a detailed view of a circled portion of FIG. 8a.

FIG. 9 is a cross-sectional view of the combination check valve and release valve of FIG. 8a, when the release valve is activated.

Figure 10:
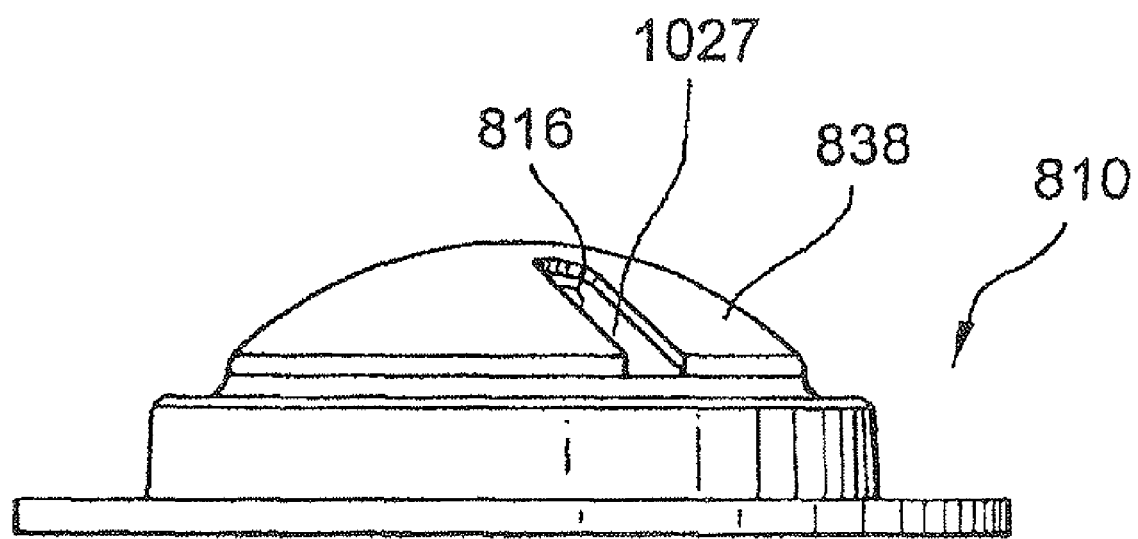

FIG. 10 is a perspective view of a cap of the combination check valve and release valve of FIGS. 8a, 8b and 9.

Figure 11A:
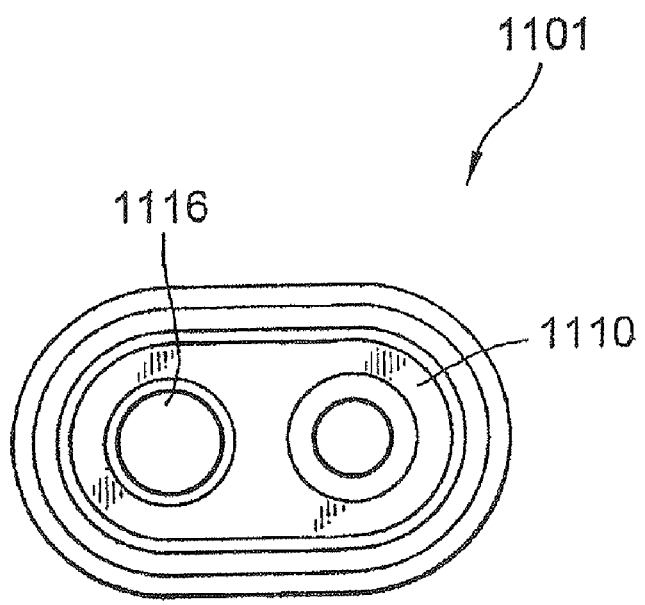
Figure 11B:
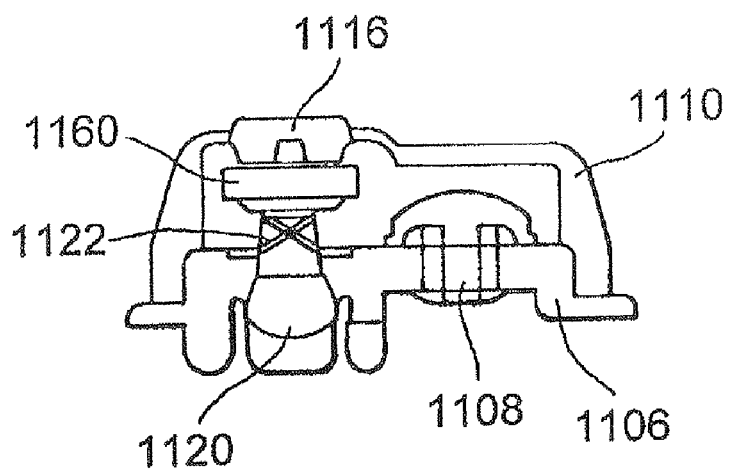

FIG. 11a is an above plan view of another combination check valve and release valve of the present invention. FIG. 11b is a schematic cross-sectional view of the combination check valve and release valve of FIG. 11a.

Figure 12:
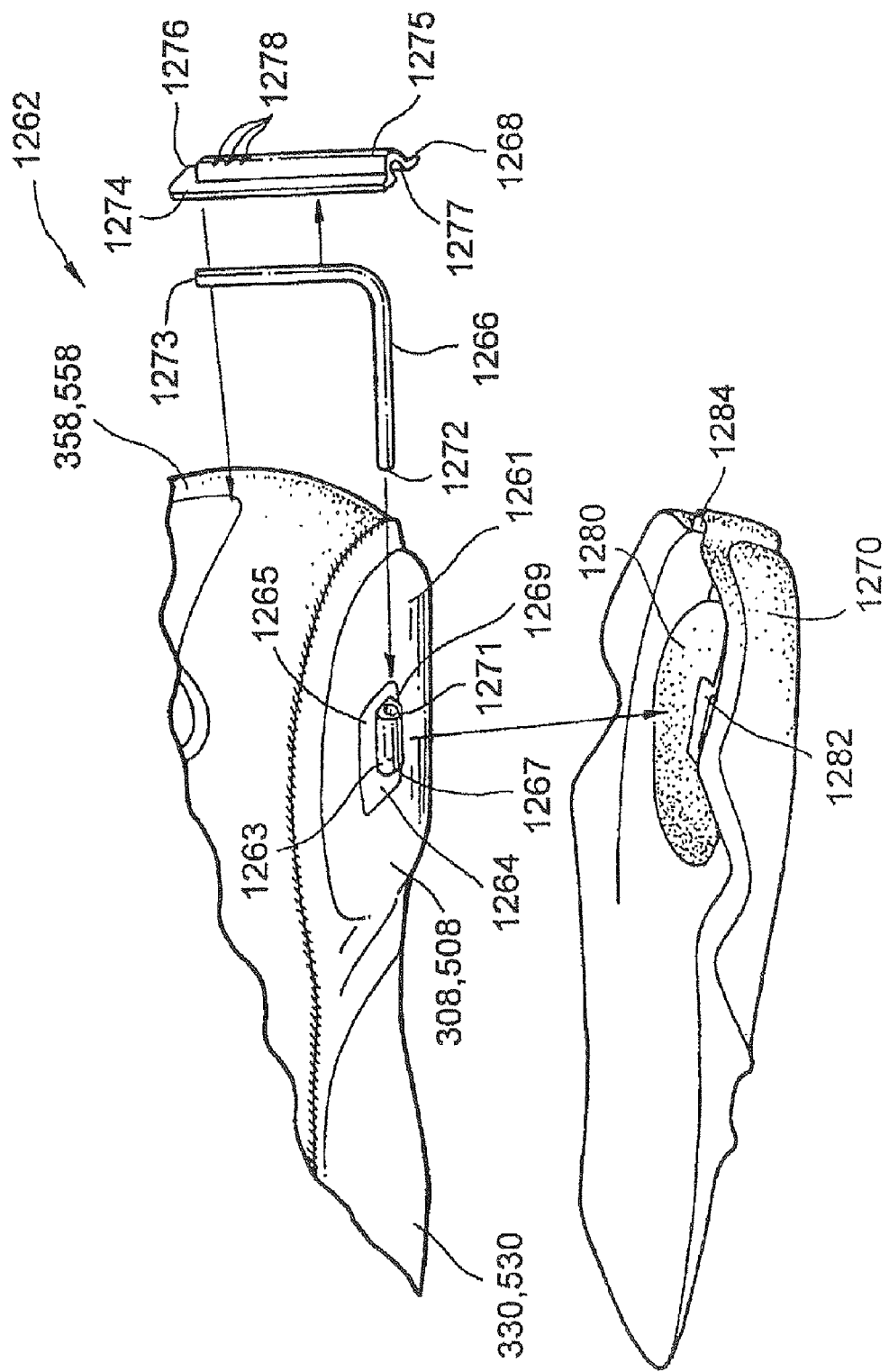

FIG. 12 is an exploded perspective view of a snorkel assembly of the present invention.

Figure 13:
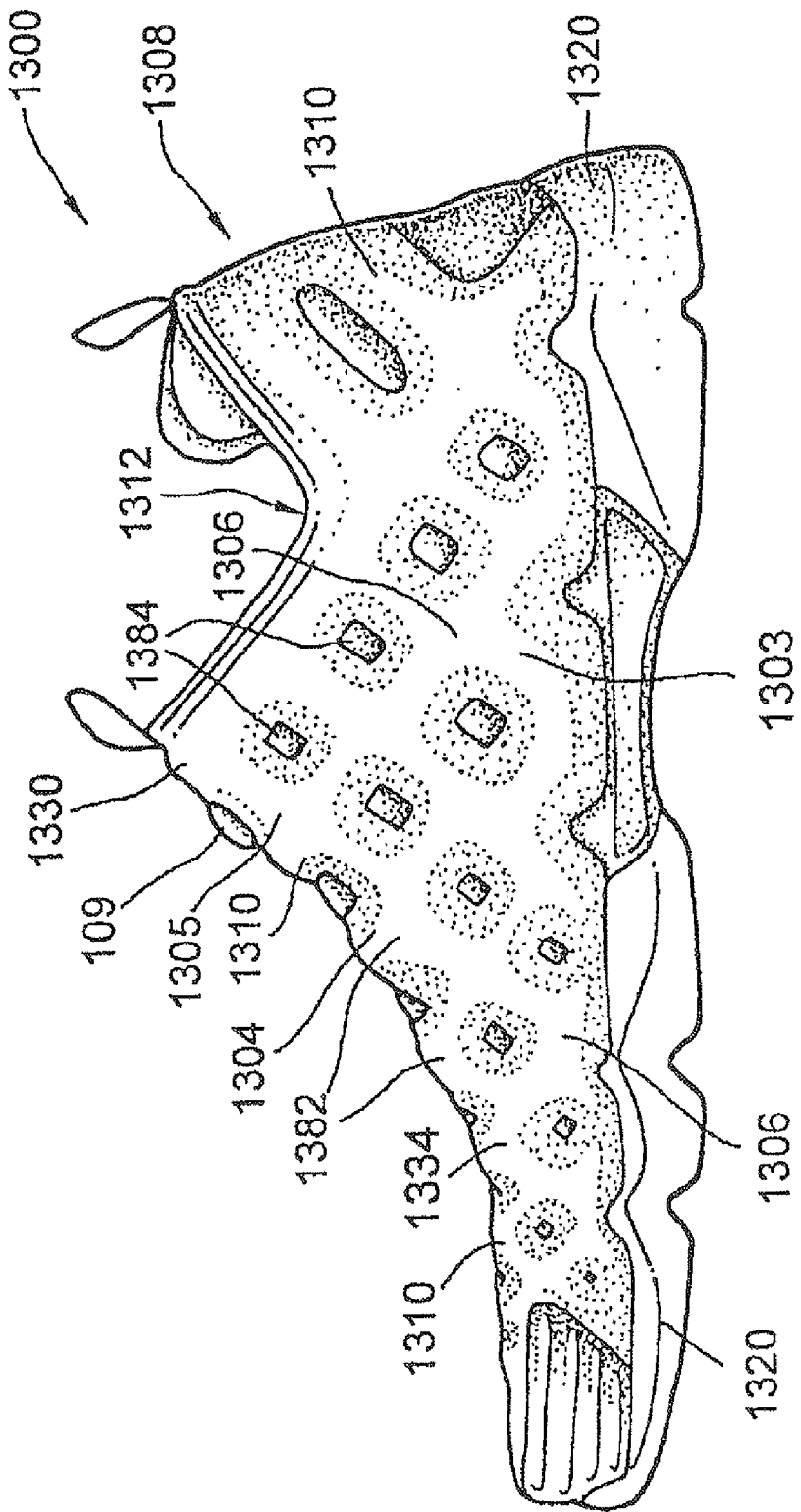

FIG. 13 is a lateral side view of an embodiment of the present invention.

Figure 14:
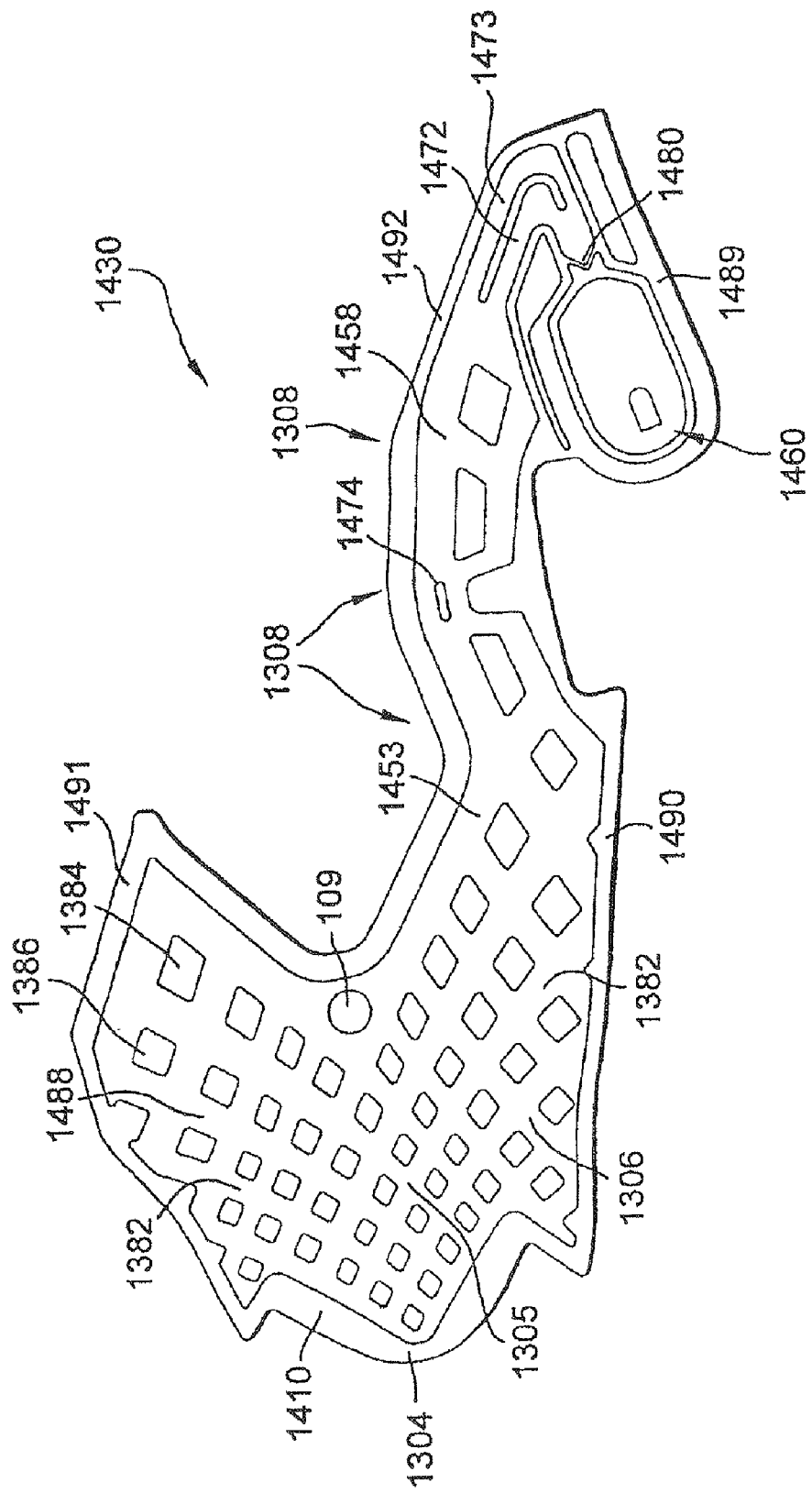

FIG. 14 is an above plan view of a bladder of the present invention.

Figure 15:
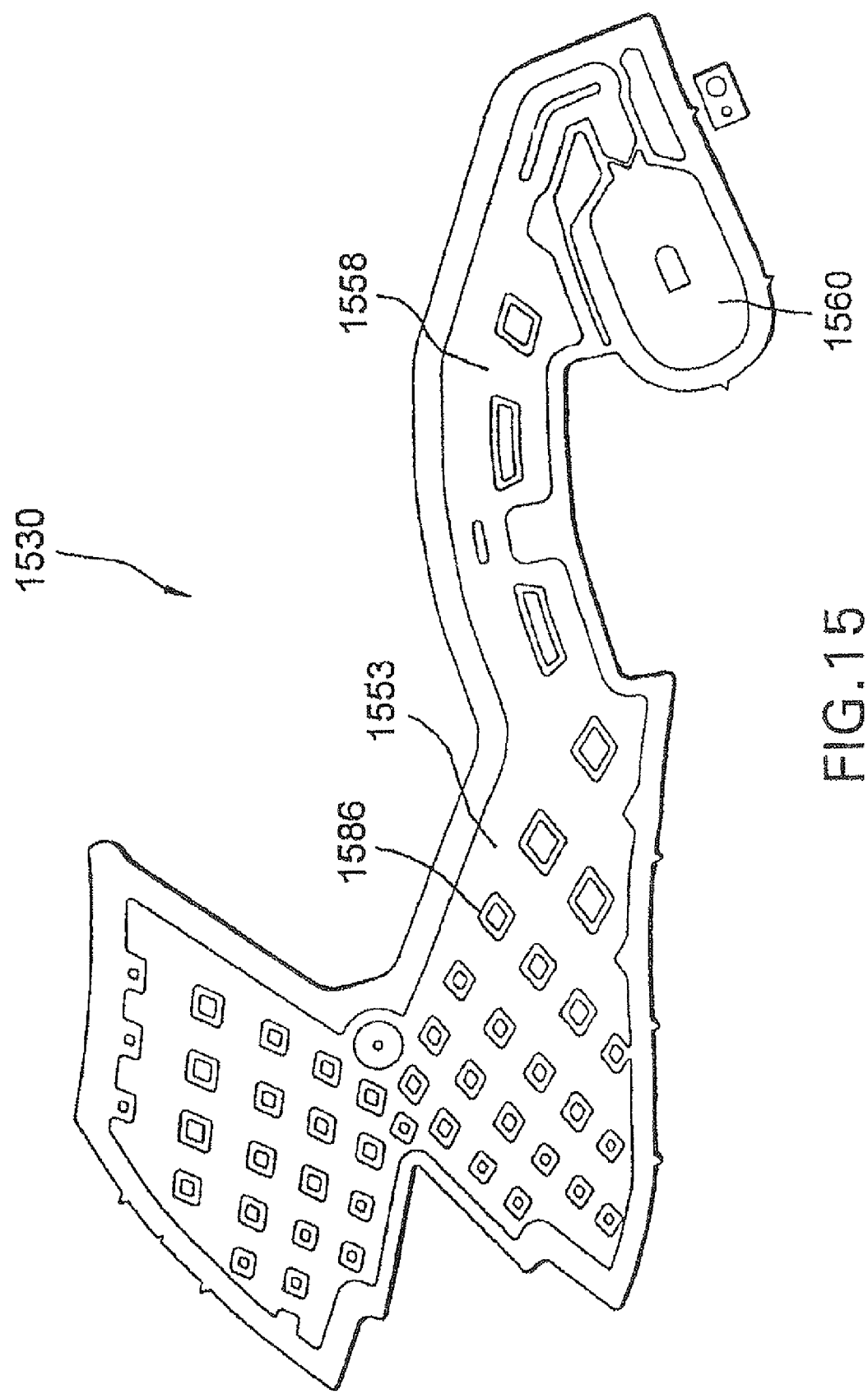

FIG. 15 is an above plan view of an alternative bladder of the present invention.

Figure 16:
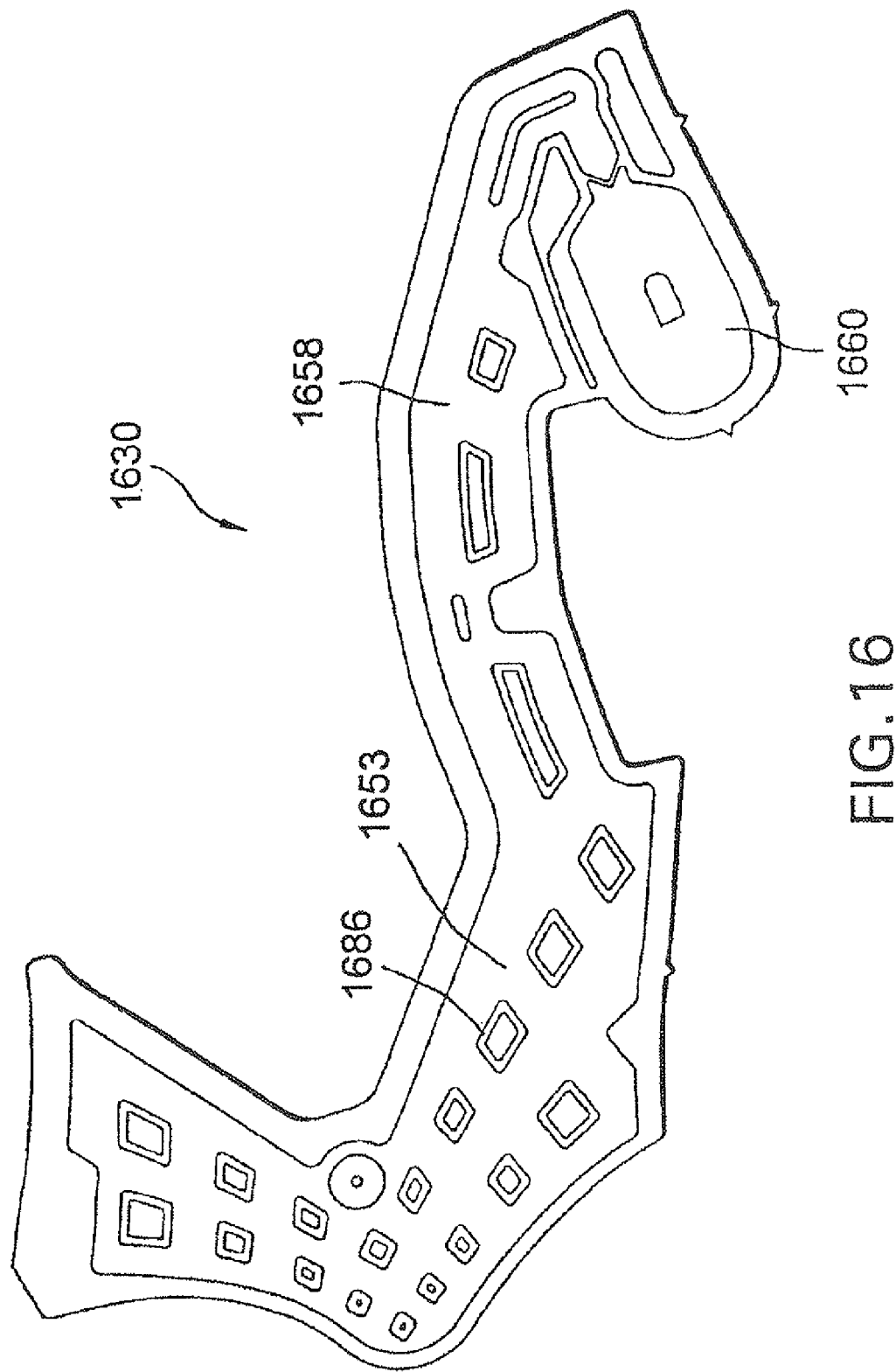

FIG. 16 is an above plan view of an alternative bladder of the present invention.

Figure 17:
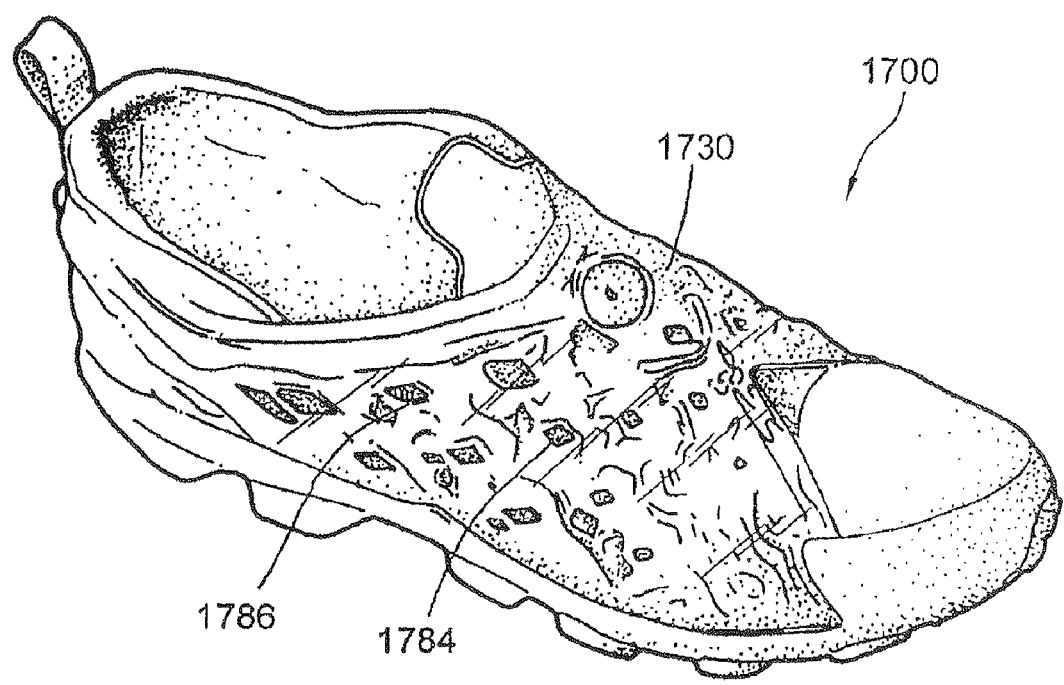

FIG. 17 is a lateral side of a shoe of the present invention.

Figure 18:
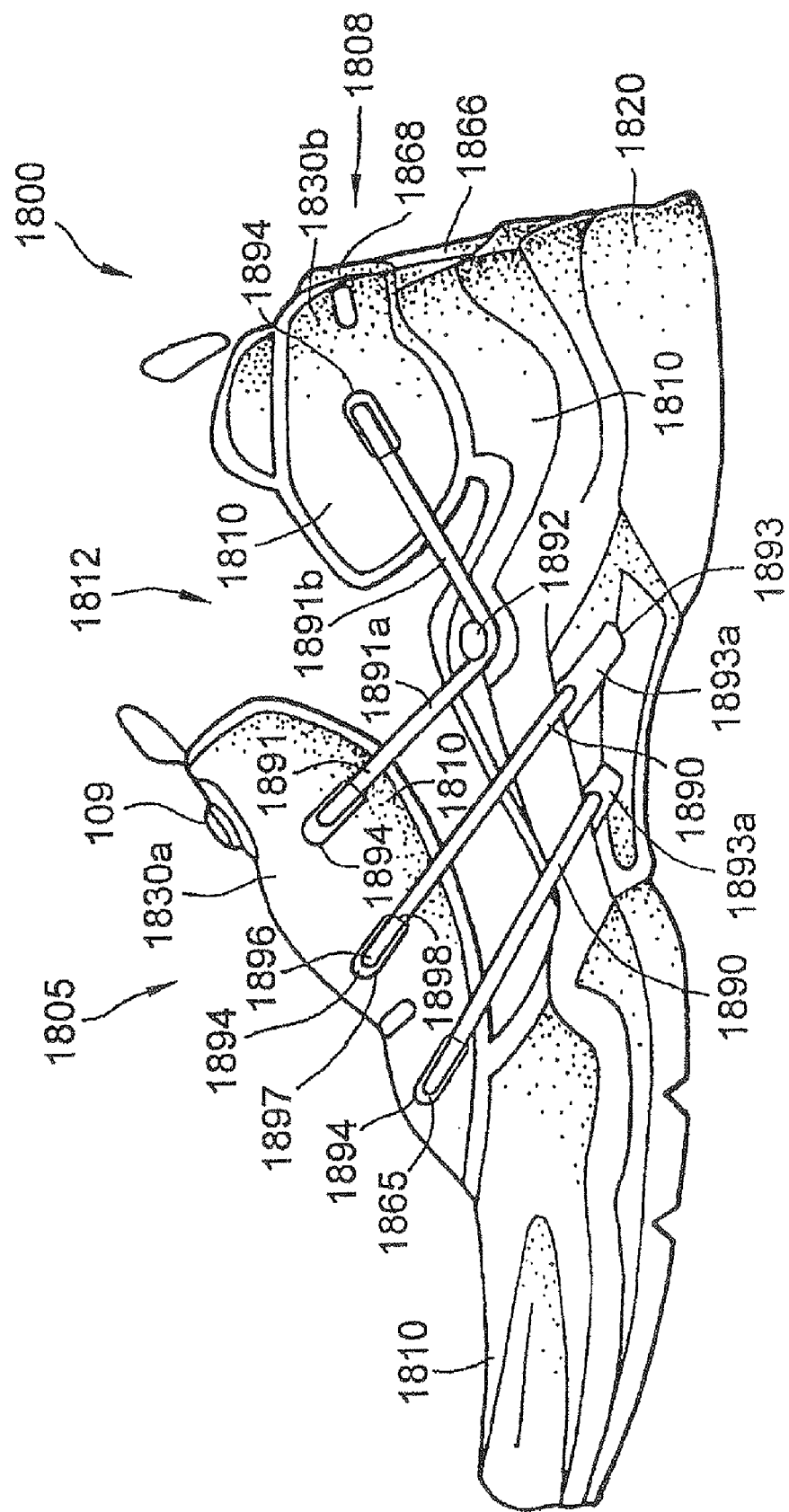

FIG. 18 is a lateral side view of an embodiment of the present invention.

Figure 19B:
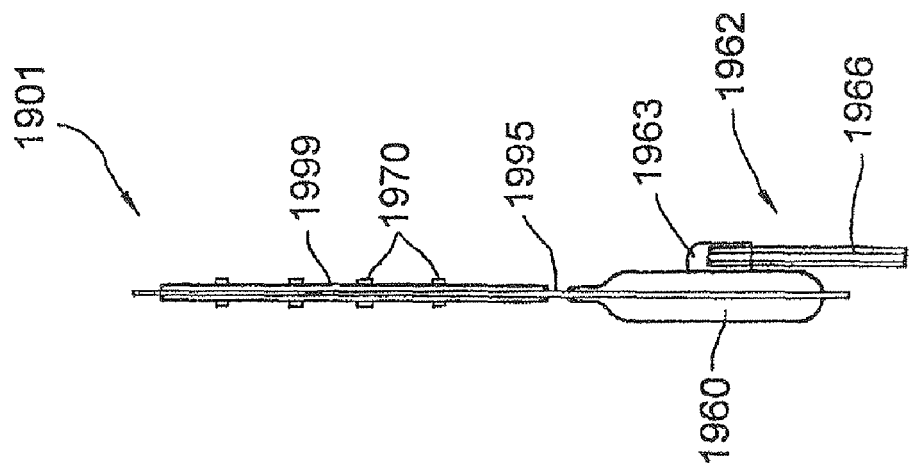
Figure 19A:
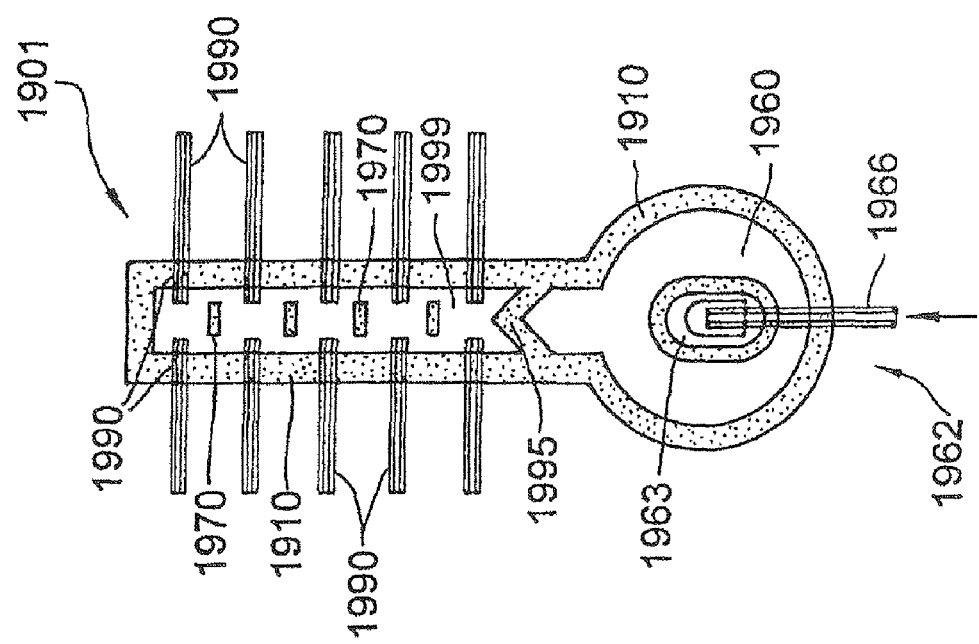

FIG. 19a is an above plan view of a heel compartment assembly of the present invention. FIG. 19b is a side plan view of the heel compartment assembly of FIG. 19a.

Figure 20:
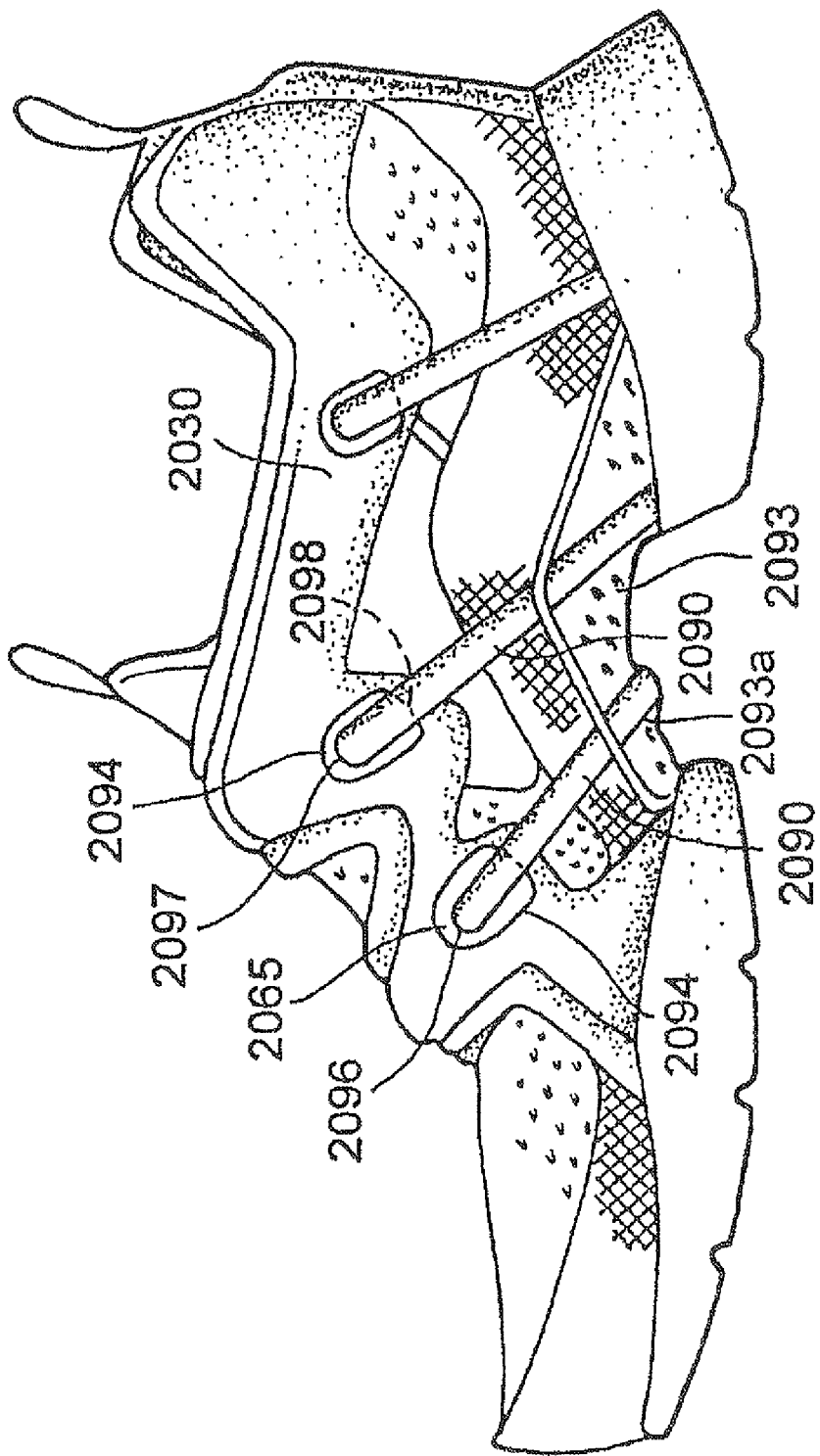

FIG. 20 is a lateral side view of another embodiment of the present invention.

Figure 21:
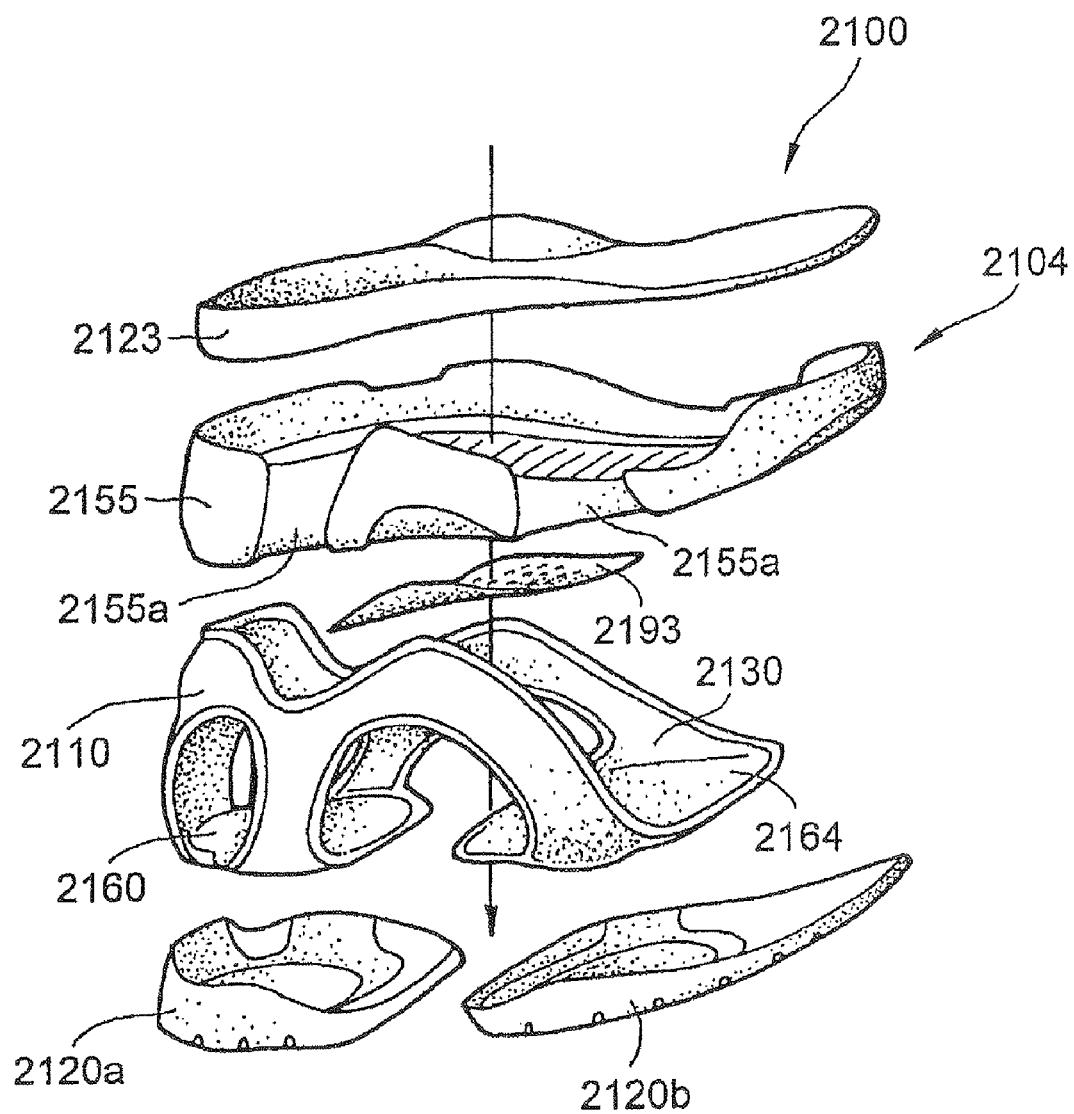

FIG. 21 is an exploded perspective view of another embodiment of the present invention.

Figure 22:
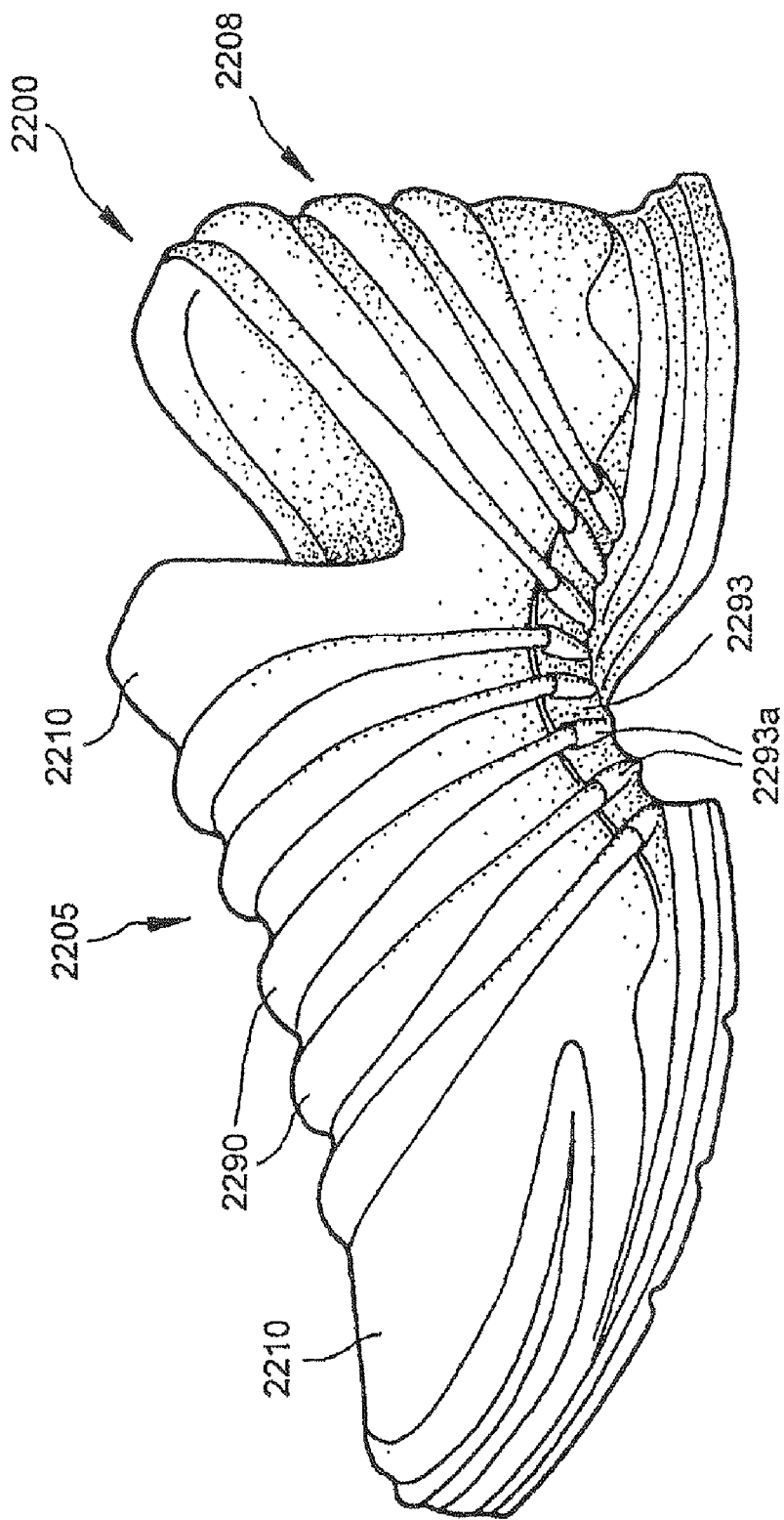

FIG. 22 is a lateral side view of another embodiment of the present invention.

Figure 23:
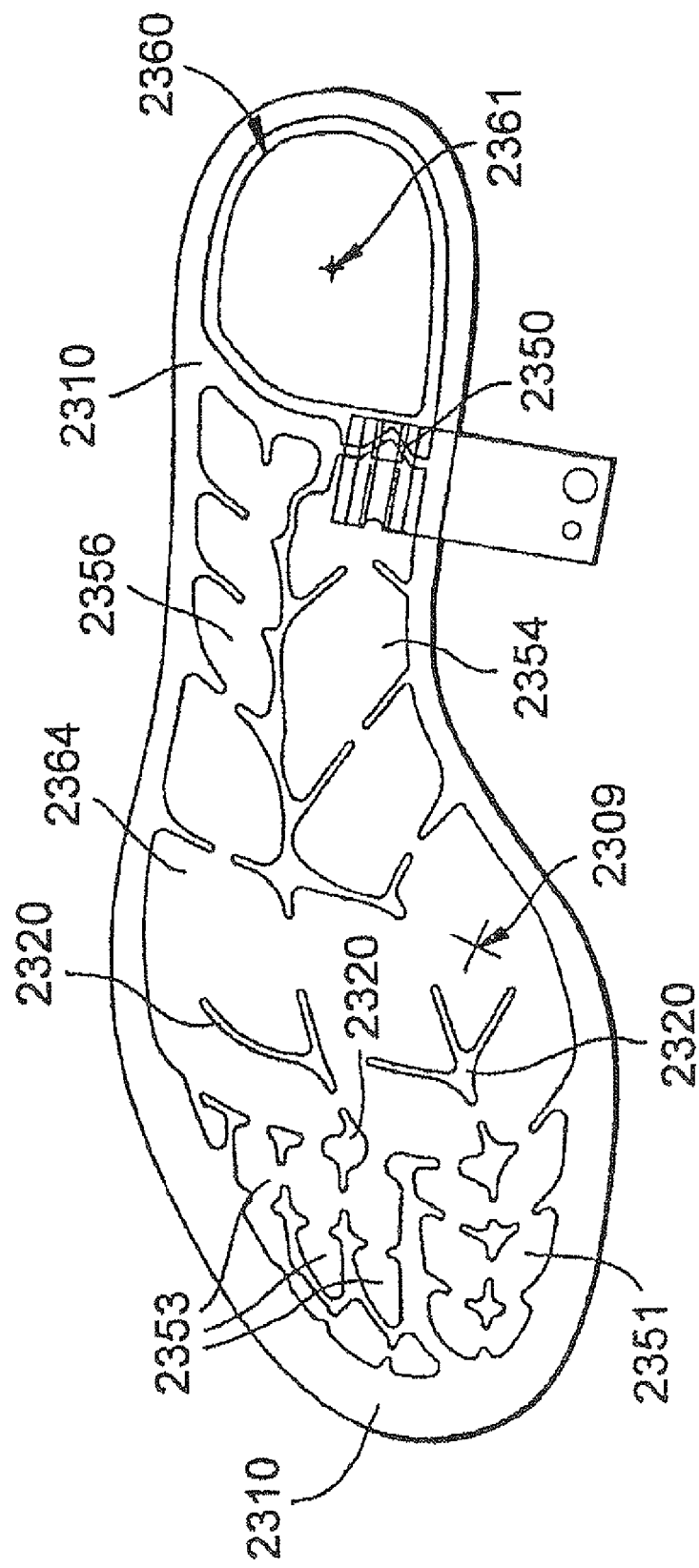

FIG. 23 is an above plan view of an inflatable sockliner of the present invention.

DETAILED DESCRIPTION OF THE INVENTION

A preferred embodiment of the present invention is now described with reference to the Figures, in which like reference numerals are generally used to indicate identical or functionally similar elements. Also in the Figures, the left most digit of each reference numeral generally corresponds to the Figure in which the reference numeral first appears. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in other applications.

Figure 1:
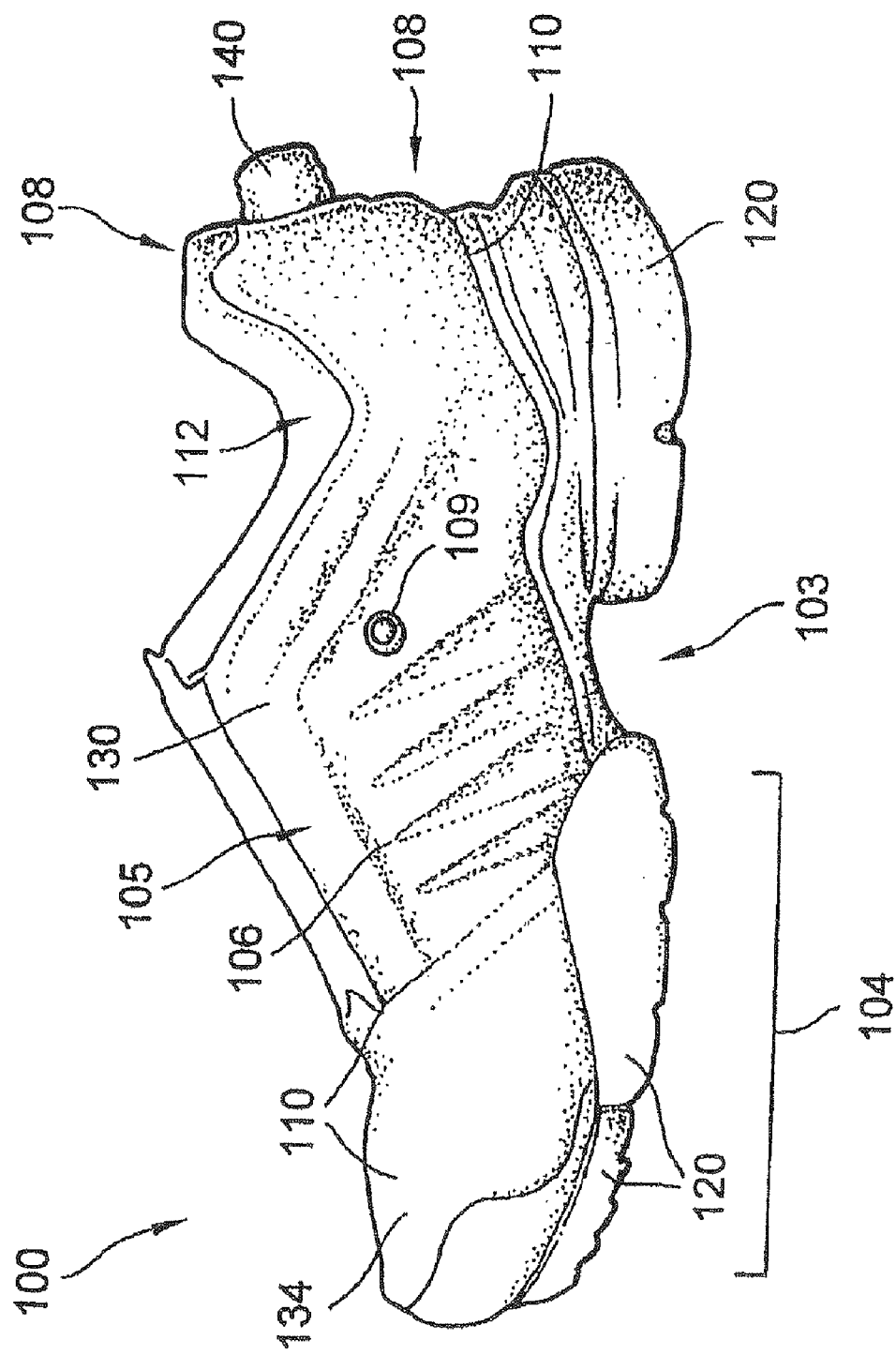
FIG. 1 is a lateral side of a shoe incorporating the present invention.

A shoe for a right foot according to the present invention is shown generally at 100 in FIG. 1. A corresponding shoe for the left foot could be a mirror image of shoe 100 and therefore, is not shown or described herein. As shown in FIG. 1, shoe 100 has a heel area shown generally at 108, an arch area shown generally at 103, a vamp area shown generally at 105, a forefoot area shown generally at 104, and a medial side area generally shown at 106. The present invention does not necessitate a conventional leather or cloth upper, particularly with the additional foam padding found along the interior of a typical athletic shoe upper. Therefore, shoe 100 includes a sole 120 and an upper 110 of which at least a portion entirely comprises an inflatable bladder 130. In addition, upper 110 of FIG. 1 has a toe portion 134. As demonstrated in FIG. 1, toe portion 134 need not be constructed from bladder 130. However, in alternative embodiments, bladder 130 may form any or all portions of upper 110, including toe portion 134. Upper 110 has an opening shown generally at 112, which is designed to receive a wearer's foot.

In order for a wearer to customize the amount of air in the bladder at any time, bladder 130 is in communication with an inflation mechanism. In an embodiment shown in FIG. 1, a generic inflation mechanism 140 is attached to bladder 130 in the heel area of the shoe. However, in alternate embodiments, inflation mechanism 140 may be located on the tongue of the shoe, on the sole of the shoe, on the side of the shoe, or any other area of the shoe as would be apparent to one skilled in the relevant art. For example, another embodiment comprising an inflation mechanism on the tongue will be later discusses with reference to FIG. 2.

A variety of different inflation mechanisms can be utilized in the present invention. The inflation mechanism may be, for example, a simple latex bulb which is physically attached to the shoe. Alternatively, the inflation mechanism may be a molded plastic chamber as shown in FIG. 1 or may be a hand held pump such as one which utilizes $CO_2$ gas to inflate a bladder. Finally, as will be described with reference to FIG. 3 and FIG. 5, a portion of the bladder can be isolated from the remainder of the bladder. This isolated portion fluidly communicates with the remainder of the bladder via a one-way valve. This one-way valve allows the isolated portion to act as an inflation mechanism. Having an isolated portion of the bladder act as an inflation mechanism is preferably suitable for an underfoot bladder so as to automatically inflate the bladder as a user engaged in activity. However such an inflation mechanism may be used on any portion of the shoe. Preferably, the inflation mechanism is small, lightweight, and provides a sufficient volume of air such that only little effort is needed for adequate inflation. For example, U.S. Pat. No. 5,987,779, which is incorporated by reference, describes an inflation mechanism comprising a bulb (of various shapes) with a one-way check valve. When the bulb is compressed air within the bulb is forced into the desired region. As the bulb is released, the check valve opens because of the pressure void in the bulb, allowing ambient air to enter the bulb. Another inflation mechanism, also described in U.S. Pat. No. 5,987, 779, incorporated herein by reference, is a bulb having a hole which acts as a one-way valve. A finger can be placed over the hole in the bulb upon compression. Therefore, the air is not permitted to escape through the hole and is forced into the desired location. When the finger is removed, ambient air is allowed to enter through the hole. An inflation mechanism having collapsible walls in order to displace a greater volume of air may be preferred. A similar inflation mechanism may include a temporarily collapsible foam insert. This foam insert ensures that when the bulb is released, the bulb expands to the natural volume of the foam insert drawing in air to fill that volume. A preferred foam is a polyurethane, such as the 4.25-4.79 pound per cubic foot polyether polyurethane foam, part number FS-170-450TN, available from Woodbridge Foam Fabricating, 1120-T Judd Rd., Chattanooga, Tenn., 37406.

U.S. Pat. No. 6,287,225, incorporated herein by reference, describes another type of on-board inflation mechanism suitable for the present invention. One skilled in the art can appreciate that a variety of inflation mechanisms are suitable for the present invention. In addition, any inflation mechanism is appropriate for use with any embodiments of the present invention.

The inflation mechanism shown in FIG. 1 is an accordion style inflation mechanism comprising a plastic, collapsible case. Air enters through a hole open to the exterior of the inflation mechanism. The inflation mechanism operates similar to that described above with respect to the bulb inflation mechanism except that the casing is collapsed accordion-style to increase the amount of air forced into the system. Upon release, the accordion-style casing expands and the air is forced into the casing to regulate the pressure within the casing.

These inflation mechanisms all require a one-way valve be placed between the inflation mechanism and the bladder 130, so that once air enters the system it may not travel backwards into the inflation mechanism. Various types of one-way valves are suitable for use in conjunction with the various inflation mechanisms of the present invention. Preferably, the valve will be relatively small and flat for less bulkiness. U.S. Pat. No. 5,144,708 to Pekar, incorporated herein by reference, describes a valve suitable for the present invention. The patent describes a valve formed between thermoplastic sheets. The valve described in the Pekar patent allows for simple construction techniques to be used whereby the valve can be built into the system at the same time the bladder is being welded. One skilled in the art would understand that a variety of suitable valves are contemplated in the present invention.

The one-way valve provides a method to avoid over inflation of the system. In particular, if the pressure in the bladder is equal to the pressure exerted by the inflation mechanism, no additional air will be allowed to enter the system. In fact, when an equilibrium is reached between the pressure in the bladder and the pressure of the compressed inflation mechanism, the one-way valve which opens to allow air movement from the inflation mechanism to the bladder 130 may remain closed. Even if this valve does open, no more air will enter the system. Further, one skilled in the art can design a pump to have a certain pressure output to limit the amount of air that can be pumped into bladder 130. Any one-way valve will provide a similar effect, as would be known to one skilled in the art. In addition, any one-way valve would be appropriate for use in any embodiments of the present invention.

One embodiment, as seen in FIG. 1, may include a deflation valve 109. The particular deflation valve in FIG. 1 is a release valve. A release valve is fluidly connected to bladder 130 and allows the user to personally adjust the amount of air inserted into bladder 130, particularly if the preferred comfort level is less than the pressure limits otherwise provided by the bladder. The release valve can comprise any type of release valve. One type of release valve is the plunger-type described in U.S. Pat. No. 5,987,779, incorporated herein by reference, wherein the air is released upon depression of a plunger which pushes a seal away from the wall of the bladder allowing air to escape. In particular, a release valve may have a spring which biases a plunger in a closed position. A flange around the periphery of the plunger can keep air from escaping between the plunger and a release fitting because the flange is biased in the closed position and in contact with the release fitting. To release air from bladder 130, the plunger is depressed by the user. Air then escapes around the stem of the plunger. This type of release valve is mechanically simple and light weight. The components of a release valve may be made out of a number of different materials including plastic or metal. Any release valve is appropriate for use in any embodiment of the present invention.

FIG. 1 shows one possible location of deflation valve 109 on shoe 100. However deflation valve 109 may be positioned in any number of different locations provided that it is fluidly connected with bladder 130, as would be apparent to one skilled in the relevant art. Additionally, shoe 100 may include more than one deflation valve. As an alternative, deflation valve 109 may also be a check valve, or blow off valve, which will open when the pressure in bladder 130 is at or greater than a predetermined level. In each of these situations, bladder 130 will not inflate over a certain amount no matter how much a user attempts to inflate the shoe. One type of check valve has a spring holding a movable seating member against an opening in the bladder. When the pressure from the air inside the bladder causes a greater pressure on the movable seating member in one direction than the spring causes in the other direction, the movable seating member moves away from the opening allowing air to escape the bladder. Another type of check valve is an umbrella valve, such as the VA-3497 Umbrella Check Valve (Part No. VL1682-104) made of Silicone VL1001M12 and commercially available from Vernay Laboratories, Inc. (Yellow Springs, Ohio, USA). In addition, any other check valve is appropriate for use in the present invention, as would be apparent to one skilled in the art. Further, any check valve would be appropriate for use in any of embodiments of the present invention.

In another embodiment, deflation valve 109 may be adjustable check valve wherein a user can adjust the pressure at which a valve is released. An adjustable check valve has the added benefit of being set to an individually preferred pressure rather than a factory predetermined pressure. An adjustable check valve may be similar to the spring and movable seating member configuration described in the preceding paragraph. To make it adjustable, however, the valve may have a mechanism for increasing or decreasing the tension in the spring, such that more or less air pressure, respectively, would be required to overcome the force of the spring and move the movable seating member away from the opening in the bladder. However, any type of adjustable check valve is appropriate for use in the present invention, as would be apparent to one skilled in the art, and any adjustable check valve would be appropriate for use in any embodiment of the present invention.

Bladder 130 may include more than one type of deflation valve 109. For example, bladder 130 may include both a check valve and a release valve. Alternatively, bladder 130 may contain a deflation valve 109 which is a combination release valve and check valve. This type of valve is described in detail below with respect to FIGS. 7*a*-7*d*.

In one embodiment, small perforations may be formed in the bladder to allow air to naturally diffuse through the bladder when a predetermined pressure is reached. The material used to make bladder 130 may be of a flexible material such that these perforations will generally remain closed. If the pressure in the bladder becomes greater than a predetermined pressure the force on the sides of the bladder will open the perforation and air will escape. When the pressure in bladder 130 is less than this predetermined pressure, air will escape very slowly, if at all, from these perforations. Any embodiment of a bladder of the present invention may also have these perforations for controlling the amount of air within the bladder.

Bladder 130 may be formed from an exterior layer or film and a coextensive interior layer or film. The bladder may be shaped in a variety of configuration, such as that shown for bladder 230 in FIG. 2. The interior and exterior layers may be a lightweight urethane film such as is available from J. P. Stevens & Co., Inc., Northampton, Mass. as product designation MP1880. Alternatively, the layers may be thin films of ethyl vinyl acetate or a similar barrier film. The interior layer and the exterior layer may also be formed from different materials. In addition, the exterior layer may be a laminate formed from the combination of a urethane film and a thin fabric attached thereto. The interior layer is attached to the exterior layer along air-tight periphery weld lines 210. The periphery weld lines 210 attach the exterior layer to the interior layer and create a barrier to keep air between the layers. One example of a suitable method of attachment of the exterior layer to the interior layer is the application of high radio frequency (RF welding) to the edges of the first and second film. The exterior and interior layers may alternatively be heat welded or ultrasonic welded together or attached by any other air tight means. Interior weld lines 220 are also provided. These interior welded lines 220 are also formed by RF welding, heat welding, ultrasonic welding or by other suitable means, and form the compartments of the present invention discussed in detail below. The exterior layer and interior layer are only attached along the periphery weld lines 210 and the interior weld lines 220. Consequently, a pocket or bladder is formed which allows a fluid, such as air, another gas or a liquid, to be introduced between the exterior layer and the interior layer. The sheets are welded together along all the weld lines and then die cut to form the predetermined shape. Alternatively, bladder 130 may be formed by blow molding, extrusion, injection molding and sealing, vacuum forming or any other thermoforming process using a thermoplastic material.

Since bladder 130 forms at least a portion of an exterior and/or an interior surface of upper 110, as seen in an embodiment of FIG. 1, a bladder of the present invention may also be formed with a thin layer of external material bonded or laminated to one or both of the exterior and interior layers. The bonding can occur either before or after the formation of the bladder. One suitable material is LYCRA® (available from DuPont). LYCRA® is a flexible and breathable material. Alternatively, one or both of the exterior and interior layers may be bonded to a foam laminate, any type of synthetic material, or any other material that would be available to one skilled in the art, or that is typically used in the production of a shoe. In a preferred embodiment, the bladder with or without the bonded material forms a portion of both the exterior and the interior of the shoe. Returning to FIG. 2, bladder 230 includes a plurality of compartments including medial compartment 254, lateral compartment 256, medial heel compartment 259, lateral heel compartment 258, and sole compartments designated arch compartment 252, heel compartment 260, midfoot compartment 262 and forefoot compartment 264. Those compartments disposed on the medial side of the shoe are fluidly connected to those compartments disposed on the lateral side of the shoe via fluid connection junction 274 located in the achilleas tendon portion of the shoe. In the embodiment shown in FIG. 2, inflation mechanism 208 is fluidly connected to medial compartment 254 and fluidly connected via passageway 272 to the medial heel compartment 259. Medial compartment 254 provides cushioning to the medial side of the foot and is fluidly interconnected to arch compartment 252 which provides cushioning under the arch of the foot. Medial compartment 254 is also fluidly connected to medial heel compartment 259 via passageway 276 and to lateral heel compartment 258 via connection junction 274, providing cushioning around heel area 108. Lateral heel compartment 258 is fluidly connected to lateral compartment 256 via passageway 278 which provides cushioning along the lateral side of the foot.

Figure 2:
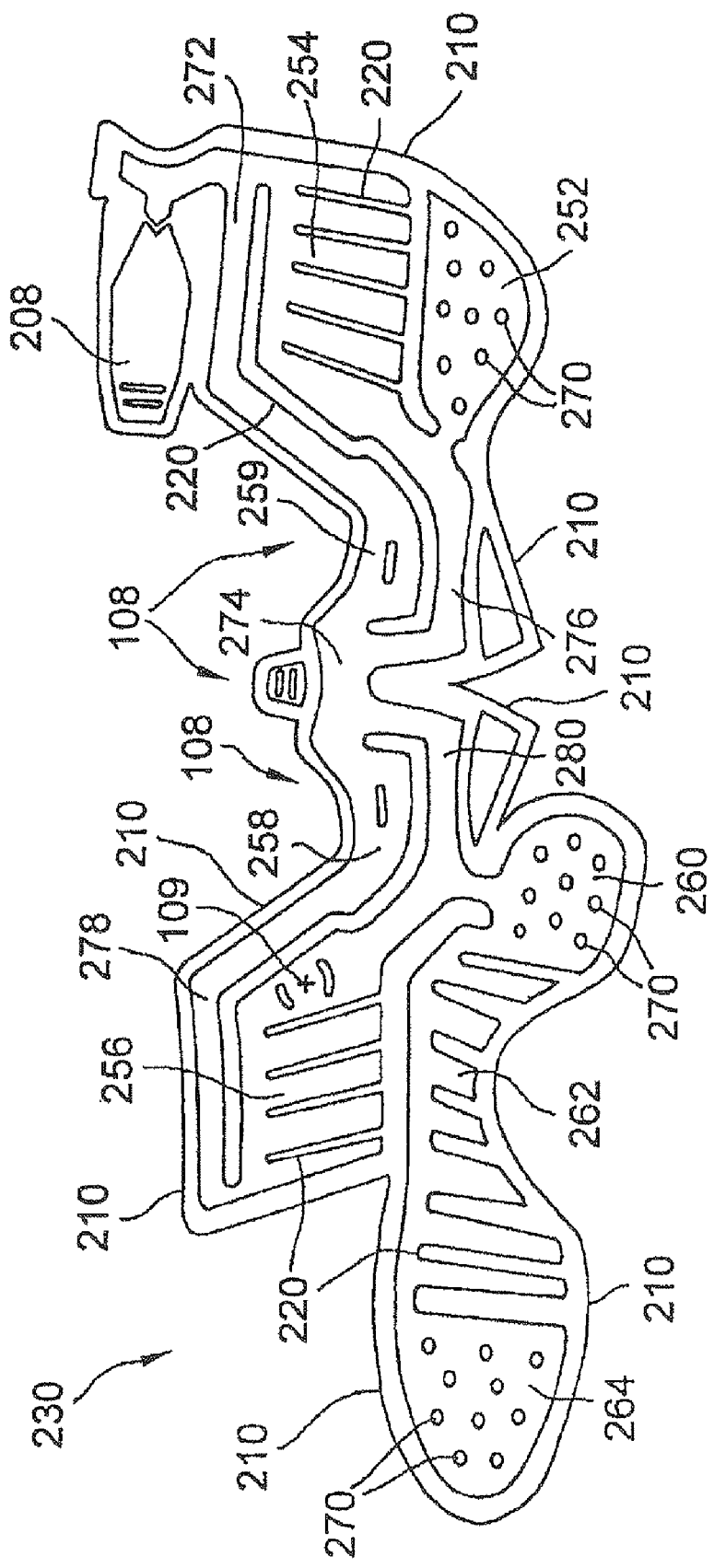
FIG. 2 is a top view of a bladder of the present invention.

Lateral compartment 256 is fluidly connected to heel compartment 260 which provides cushioning to the heel of the foot. Heel compartment 260 is also fluidly connected to connection junction 274 through passageway 280. Heel compartment 260 is fluidly interconnected to midfoot compartment 262 and forefoot compartment 264. As shown in FIG. 2, medial compartment 254, lateral compartment 256, midfoot compartment 262, lateral heel compartment 258, and medial heel compartment 259 are further compartmentalized. This allows shoe 100 and bladder 230 to easily flex and further conform to a user's foot.

The bladder shown in FIG. 2 provides cushioning and a custom fit to the entire foot, including the sides of the foot. This increases the comfort of the wearer. Further, because the compartments located on the sides of the foot are fluidly connected to the different compartments located underneath the foot, air can flow to both sides of the shoe when the compartments located underneath the foot are under compression. Although bladder 230 is shown with lateral compartment 256 being fluidly connected to heel compartment 260 and medial compartment 254 being fluidly connected to arch compartment 252, it would be apparent to one skilled in the relevant art that any of the compartments located along the side and heel of the foot could be fluidly connected to any one of the compartments located beneath the foot to allow air to transfer from the bottom of the shoe to the sides of the shoe and vice versa. Furthermore, in alternate embodiments bladder 230 could include fewer or greater numbers of compartments, and the compartments of bladder 230 may be another size or shape, as would be apparent to one skilled in the relevant art.

In a preferred embodiment, bladder 230 may include welds 270, such as those shown in forefoot compartment 264, heel compartment 260 and arch compartment 252. Welds 270 are used to control the thickness of the bladder when the bladder is in its filled configuration (e.g., air has been pumped into the bladder). Welds 270 are also formed by RF welding, heat welding, ultrasonic welding or by other suitable means. In regions of the bladder where it is desirable to have bladder 230 inflated to a minimal thickness, the density of circular welds 270 may be greater than the areas where it is permissible or desirable for bladder 130 to be inflated to a greater thickness. These welds may be circular or any other geometry, such as triangular, oval or square, provided that they are shaped to limit and control the inflation dimensions of the bladder of the present invention.

As shown in FIG. 2, deflation valve 109 may be located in lateral compartment 256 of bladder 230, and inflation mechanism 208 may be fluidly connected to medial compartment 254. However, in alternate embodiments, inflation mechanism 208 and deflation valve 109 may be located in any area of bladder 230, which would be apparent to one skilled in the relevant art, or absent altogether. FIG. 2 shows an elongated inflation mechanism, which may fit more conveniently along a tongue portion of a shoe than a rounded bulb or an accordion style inflation mechanism. As stated earlier, any type of inflation mechanism is suitable for use in the present invention, as would be clear to one skilled in the art. Similarly all types of deflation valves described, above, with reference to bladder 130 may be used in an embodiment such as bladder 230. Bladder 230 may also use perforations or one-way valves to control the amount of air in bladder 230, as described above.

Figure 3:
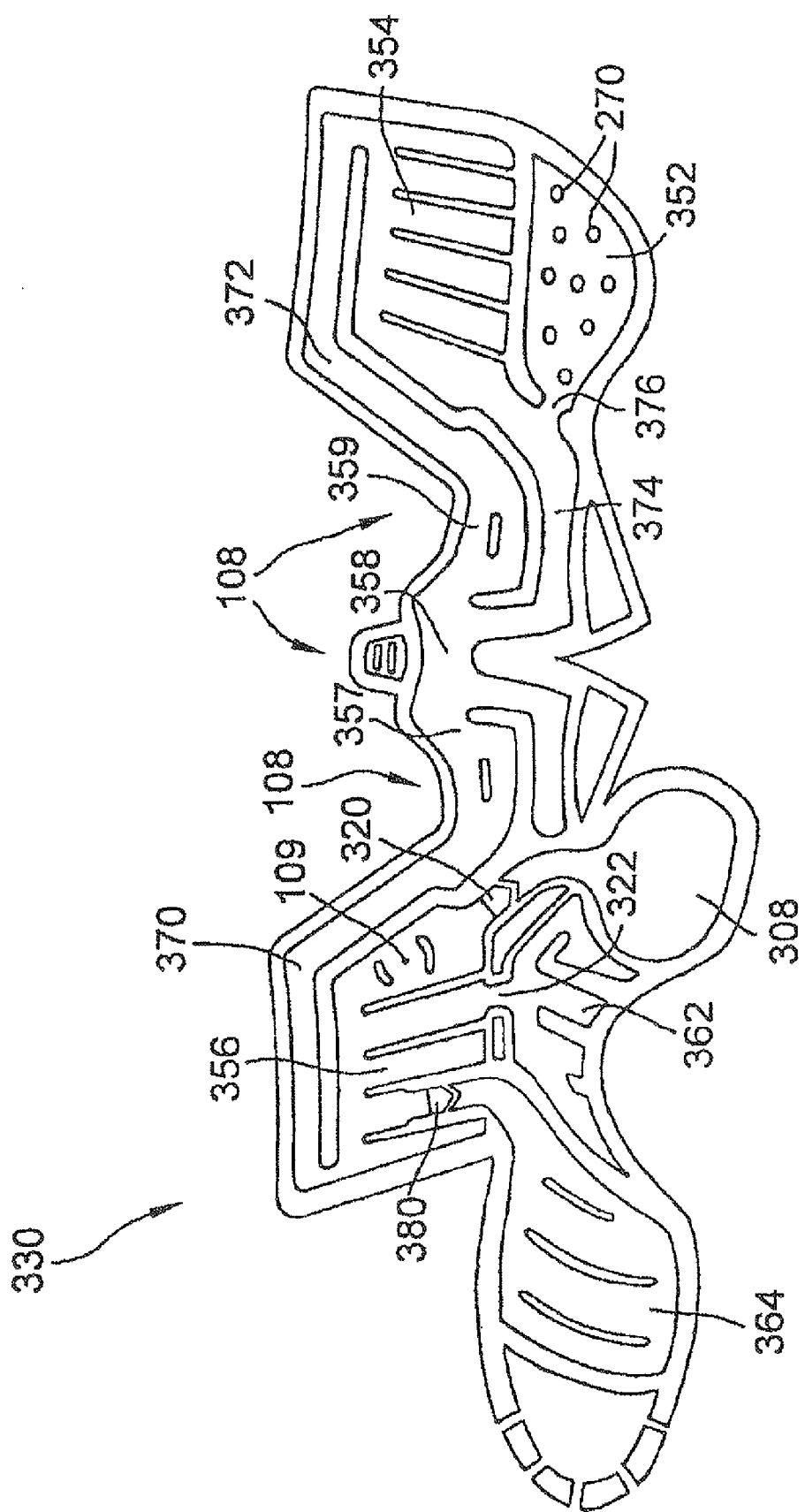
FIG. 3 is a top view of an alternate embodiment of the bladder.

FIG. 3 shows an alternate embodiment of a bladder 330, wherein heel compartment 308 acts as an inflation mechanism under the heel area of the foot. A hole may be located in heel compartment 308 so that, with each step that is taken, the hole is sealed shut and the air located in heel compartment 308 is forced through one-way valve 320 into lateral compartment 356 and on through the rest of bladder 330. The downward pressure from the heel against the hole creates an air tight seal so that the air in heel compartment 308 is forced through the one-way valve. One-way valve 320 will allow fluid to flow only in the direction opposite the direction of the arrow in FIG. 3. As the gait cycle continues, the heel of the foot rises releasing the pressure on heel compartment 308 and removing the seal covering the hole. Air, preferably from inside the shoe or alternatively from a tube directed outside of the shoe, is forced through the hole to equalize the pressure in heel compartment 308. Consequently, a inflating mechanism is created that consistently provides air to bladder 330 with each step. Alternatively, a butterfly valve could be used instead of a hole. One example is disclosed in U.S. Pat. No. 5,372,487 to Pekar, the disclosure of which is incorporated by reference. Also, as an alternative, heel compartment 308 may include a collapsible foam insert generally equivalent to the volume of heel compartment 308. The heel of the foot compressed the foam insert and heel compartment 308 in a typical gait cycle. As the heel is released, the foam insert expands to its original shape expanding the volume of the heel compartment 308 and allowing air to enter with the expansion of the heel compartment 308. A further example of a heel compartment comprising a foam insert is describe in detail below with respect to FIG. 5.

Lateral compartment 356 is further fluidly connected to midfoot compartment 362 through passageway 322, and forefoot compartment 364 is fluidly connected to lateral compartment 356 through one-way valve 380. FIG. 3 shows a second inflation mechanism in forefoot compartment 364. This inflation mechanism is designed to work the same as the inflation mechanism discussed above for the heel compartment 308. In this embodiment, air is forced into lateral compartment 356 through one-way valve 380 as the forefoot rolls onto forefoot compartment 364. Air is allowed to enter forefoot compartment 364 via a hole as discussed above or via a valve as described above. Also, forefoot compartment 364 may comprise a foam insert, as described above for heel compartment 308. In other words, the shoe of FIG. 3 utilizes two inflation mechanisms, which together decrease the time it takes to inflate the bladder. By using two inflation mechanisms, one in the heel and one in the forefoot, a user begins to feel the shoe inflating in only a few steps. In FIG. 3, both the forefoot compartment 364 and the heel compartment 308 are shown to inflate the bladder. It should be understood that as an alternative, the forefoot compartment 364 could be orientated to inflate one portion of the bladder while heel compartment 308 inflates another portion of the bladder. Weld lines can be utilized to isolate portion of the bladder to accomplish this result. Lateral compartment 356 is fluidly connected to lateral heel compartment 357 through fluid passageway 370. Lateral heel compartment 357 is fluidly connected to medial heel compartment 359 via fluid connection junction 358, providing support around the heel portion 108 of shoe 100. Medial heel compartment 359 is fluidly connected to medial compartment 354 through fluid passageways 372 and 374. Medial compartment 354 is also fluidly connected to arch compartment 352.

FIG. 3 shows that forefoot compartment 364, midfoot compartment 362, lateral compartment 356, medial compartment 354, lateral heel compartment 357 and medial heel compartment 359 maybe further compartmentalized for the same purpose as the similar features of FIG. 2. Also, the arch compartment 352 may have welds 270 similar to those described for FIG. 2.

Consequently, as a foot moves through a typical gait cycle, the pressure caused by the foot to the various compartments located under the foot forces the air into the various other fluidly connected parts of the bladder to provide added support around the medial side, lateral side and heel of the foot.

Figure 4:
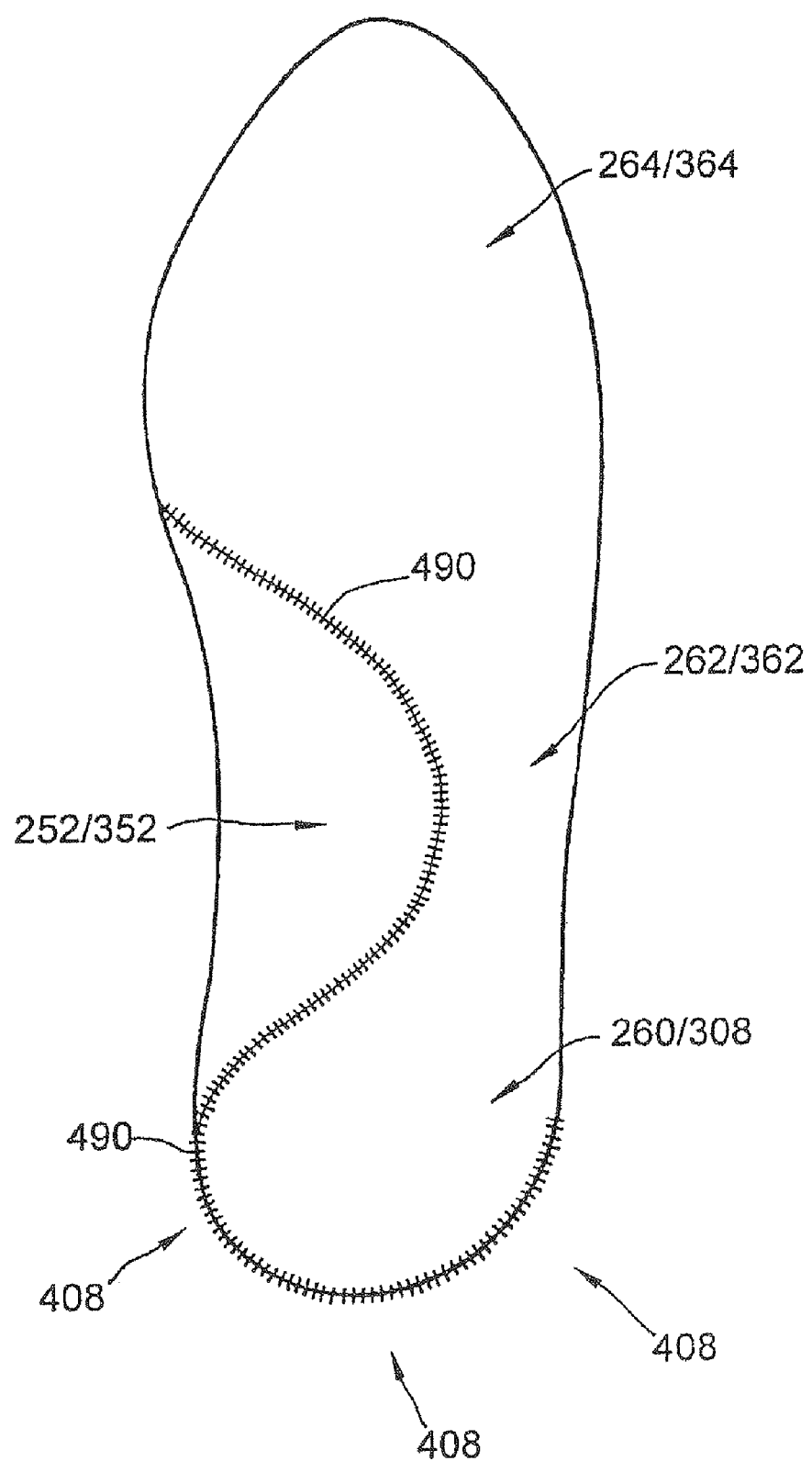
FIG. 4 is a top view showing the stitching of the bladder of FIG. 2 or 3.

The embodiment described in FIG. 3 may also have a deflation valve 109 which opens bladder 330 to the atmosphere to reduce the amount of air in bladder 330. Bladder 330 may have a release valve, wherein the individual wearer can release just the amount of pressure he or she desires, a check valve, which opens only when the air pressure in bladder 330 reaches a predetermined pressure, or a combination thereof as described below with respect to FIGS. 7a-7d. Bladder 330 may alternatively comprise an adjustable check valve, wherein the user can adjust the pressure at which the valve opens. Bladder 330 may have one or more inflation mechanisms with a one-way valve which itself may act as a system to regulate the pressure, as described above with respect to the embodiment of bladder 130. In other embodiments, bladder 330 of the present invention may include one or more manually operated inflation mechanisms located on the tongue of the shoe, near the heel of the shoe, on a lateral or medial side of the shoe, or anywhere else on the shoe as would be apparent to one skilled in the relevant art. In an embodiment as shown in FIG. 4, a bladder of the present invention, similar to those described in FIGS. 2 and 3, is stitched together by an S-shaped stitch 490 located under the foot of the wearer. This stitching is placed in a stitching margin of periphery weld lines that are formed when the bladder is die cut. The stitching connects a portion of the periphery weld of an arch compartment 252/352 against the periphery weld of the midfoot compartment 262/362 and heel compartment 260/308 to the periphery weld disposed in area 408 below the fluid conjunctions 274, 358, of FIGS. 2 and 3. Because the various compartments are sewn together, the bladder of the present invention forms a boot which completely surrounds the foot of the wearer. Because the components of the present invention are sewn together, the medial compartments 254, 354, of FIGS. 2 and 3, and lateral compartment 256, 356, of FIGS. 2 and 3, receive support from the other compartment. This support allows the bladder of the present invention to function as the upper itself.

Stitching is only one method for connecting these portions of the bladder. Alternatively, they may be adhered by glueing, bonding, RF welding, heat welding, ultrasonic welding, or another other method known to one skilled in the art.

Figure 5:
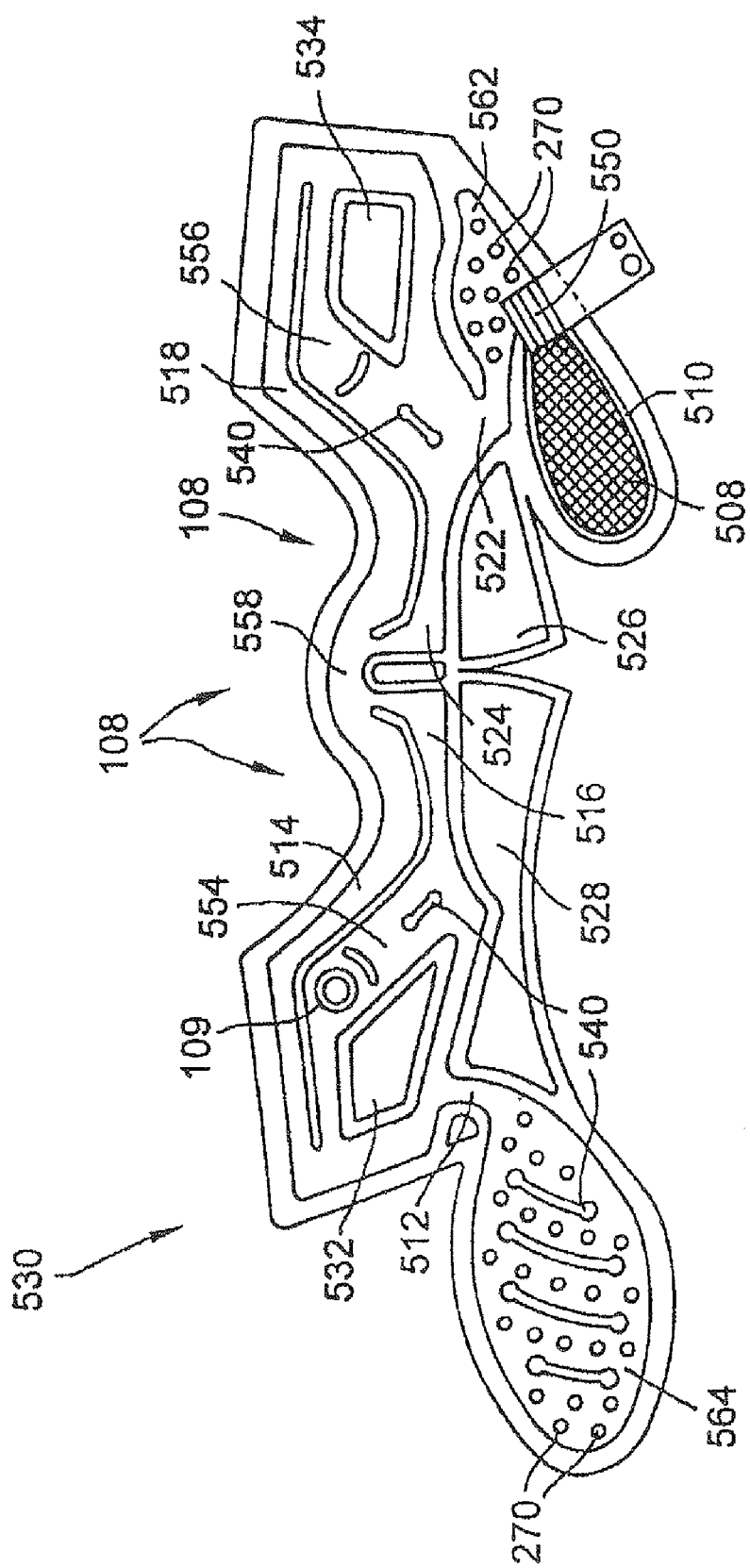
FIG. 5 is a top view of an alternate embodiment of the bladder.

In FIG. 5, another embodiment is described wherein a bladder 530 has an alternative design. Bladder 530 includes a forefoot compartment 564, which is fluidly connected to lateral compartment 554 through fluid passageway 512. Lateral compartment 554 is fluidly connected to fluid connection junction 558 through fluid passageways 514 and 516. Lateral compartment 554 and medial compartment 556 are fluidly connected across connection junction 558, which cushions the heel of the foot. Fluid connection junction 558 is fluidly connected to medial compartment 556 through fluid passageways 518 and 524. Medial compartment 556 is fluidly connected to midfoot compartment 562 through fluid passageway 522. Heel compartment 508 is fluidly connected to midfoot compartment 562 through one-way valve 520. The shape and size of each compartment may vary and may be fluidly connected in any manner by the addition or removal of various internal weld lines, as apparent to one skilled in the art. Further, alternative embodiments may have a greater or fewer number of compartments.

Each of lateral compartment 554 and medial compartment 556 may have pockets formed from internal weld lines which are not fluidly connected to the rest of the compartment. Lateral pocket 532 is located within lateral compartment 554 and medial pocket 534 is located within medial compartment 556. These pockets are pre-inflated and are not part of the adjustable inflation system of the rest of the bladder. Further, bladder 530 comprises a third pocket 528. This third pocket provides support under and along the lateral side of the foot and in heel area 108. Similarly, a fourth pocket 526 provides support to heel area 108. Pockets 528 and 526 may in fact not be inflated. Instead, the two layers remain flat against one another. The weld lines surrounding pockets 528 and 526 keep the area separated from the inflated bladder without the need to weld together the sheets of film in the interior of pockets 528 and 526. Alternatively, lateral pockets 532 and medial pocket 534 could be removed leaving openings in the bladder at the locations designated as 532 and 534.

Bladder 530 may include welds 270, such as those shown in forefoot compartment 564 and midfoot compartment 562. Welds 270 may be of any shape provided that they limit and control the inflation dimensions of the bladder of the present invention. For example, elongated welds 540 can be found in forefoot compartment 564, lateral compartment 554 and medial compartment 540. Elongated welds 540 also define and limit the inflation dimensions of bladder 530.

Any inflation mechanism may be used as described for other embodiments of the present invention. Preferred, however, is the use of heel compartment 508 as an inflation mechanism. As can be seen in FIG. 5, heel compartment 508 includes a foam core 510. Foam core 510 is likely a conventional porous polyurethane foam, such as the 4.25-4.79 pound per cubic foot polyether polyurethane foam, part number FS-170-450TN, available from Woodbridge Foam Fabricating, 1120-T Judd Rd., Chattanooga, Tenn., 37406. As a user's heel steps down in a typical gait cycle, heel compartment 508 and foam core 510 are compressed. The air in heel compartment 508 and foam core 510 is forced through one-way valve 520, into midfoot compartment 562 and throughout the other fluidly connected compartments of bladder 530. As the user's heel rises, air enters heel compartment 508 through a hole or through a one-way valve open to the atmosphere. The foam core 510 has a natural elasticity, such that the foam expands to its natural condition ensuring that heel compartment 508 expands with it. Air enters and takes up the whole volume of heel compartment 508. Further, a shoe with an underfoot inflation mechanism may comprise a sole with an indented recess, or cavity, (not shown) substantially adjacent to the inflation mechanism and substantially the shape of the inflation mechanism. When the shoe is constructed, the inflation mechanism is inserted into the indented recess. During a typical gait cycle, the inflation mechanism is compressed between the indented recess and the foot such that the foot may sink into the indented recess. The indented recess may be located in either an outsole or a midsole portion of the sole. Bladder 530 may utilize perforations or the one-way valve as a technique for limiting the about of pressure build-up. Alternatively, deflation valve 109 may be a release valve, check valve, a combination check valve and release valve (see below), or an adjustable check valve. Further more than one type of deflation valve 109 may be used. FIG. 5 shows one location for a generic deflation valve 109, however, a deflation valve may be located on any portion of bladder 530.

Figure 6:
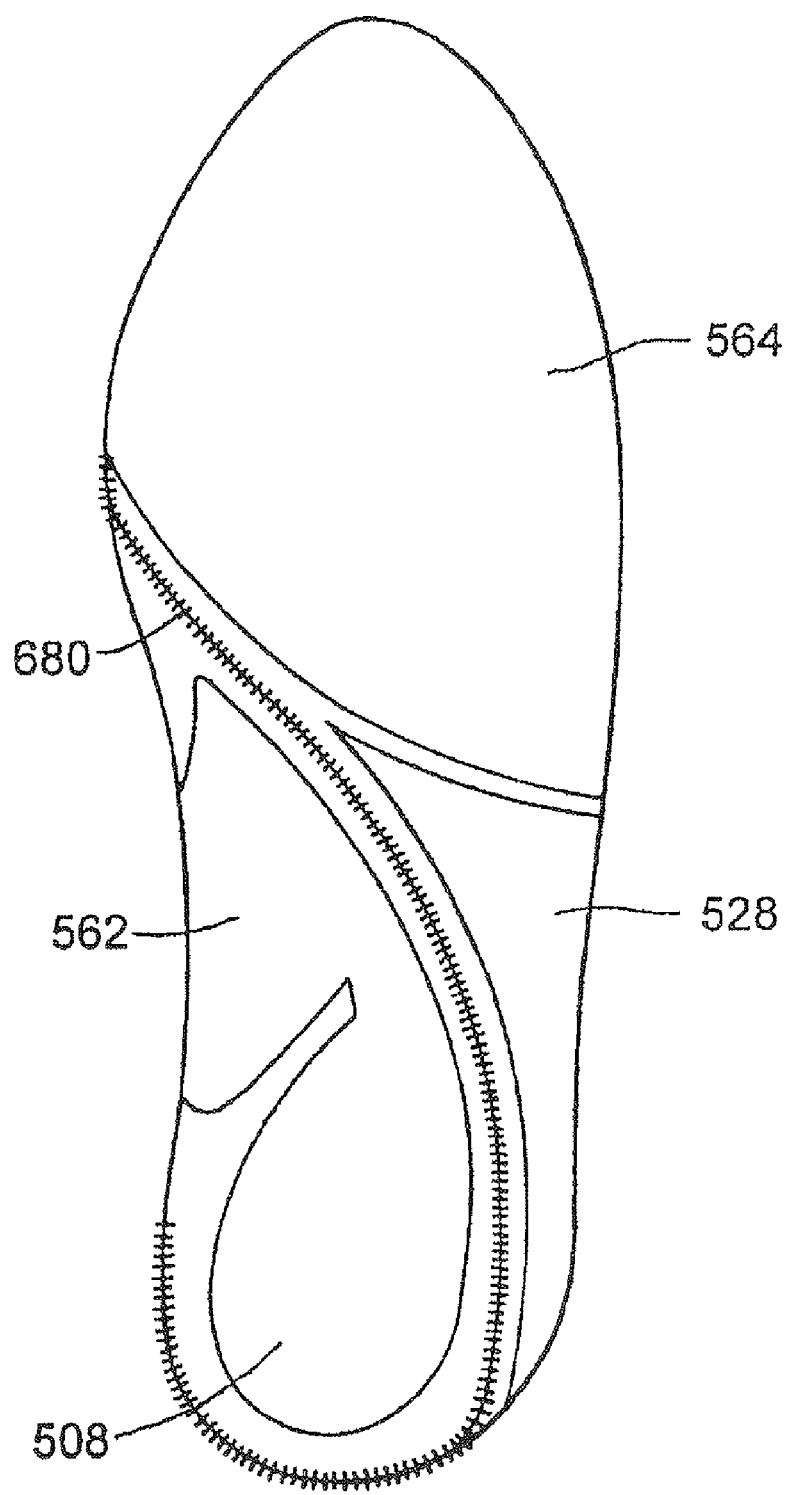
FIG. 6 is a top view showing the stitching of a bladder of FIG. 5.

In an embodiment as shown in FIG. 6, a bladder of the present invention, similar to that described in FIG. 5 is stitched together by an J-shaped stitch 690 located under the foot of the user. This stitching is placed in a stitching margin which is formed when the bladder is formed. The stitching connects a portion of the periphery weld line around forefoot compartment 564 to the periphery weld line around midfoot compartment 562 and third pocket 528 to the periphery weld line around midfoot compartment 562 and heel compartment 508, as seen in FIG. 5. In addition, the periphery weld line around heel compartment 508 is stitched to the periphery weld line adjacent to fourth pocket 526. Because the various compartments are sewn together, the bladder of the present invention forms a boot, which completely surrounds the foot of the wearer. The support of this boot allows the bladder of the present invention to function as the upper itself.

Stitching is only one method for constructing the bladder. Alternatively, periphery weld lines may be adhered by glueing, bonding, RF welding, heat welding, ultrasonic welding, or another other method known to one skilled in the art. As discussed above, the present invention may include a combination check valve and release valve. This combination check valve and release valve is depicted in FIGS. 7a-7d. The combination release valve and check valve 701 is made from sleeve 704, spring 702, base 706, umbrella valve 708 and cap 710. FIG. 7a shows an exploded view of how sleeve 704 is supported in base 706. Sleeve 704 has a lip 712 which rest on spring 702. Spring 702 fits into base 706. Sleeve 704 is preferably made of aluminum to ensure a quality surface of lip 712. Alternatively, sleeve 704 can be made from any number of plastic materials or other materials which would be known to one skilled in the art. Preferably, all the materials in combination release valve and check valve 701 are lightweight. Spring 702 is preferably made from stainless steel but may be made from a variety of metals or other materials.

FIG. 7b is an exploded view of the entire combination release valve and check valve 701. Cap 710 has a surface portion 738 and a side portion 740. Cap 710 and base 706 both may be formed from a molded plastic. Preferably, cap 710 and base 706 are formed from an injection-molded resin. For example, cap 710 may be injection molded from Estane 58863 (85 A hardness), while base 706 may be injection molded from Bayer resin (60 D hardness). Alternatively, cap 710 and base 706 may be injection molded from the same resin. Umbrella valve 708 sits through a hole 730 in the bottom of sleeve 704, as shown in FIG. 7a. An assembled combination release valve and check valve 701 is shown in FIG. 7c, wherein the release valve mechanism is not activated. Base 706 is in contact with the bladder. Air enters the combination release valve and check valve 701 via a hole 720 in base 706 which is fluidly connected to the bladder of the present invention. FIG. 7c shows umbrella valve 708 having the general shape of an umbrella and forming an air-tight seal against sleeve 704. The umbrella-shape is generally thick in the middle but foams a thin flap 718 which rests and forms an air tight seal against sleeve 704. Air from the bladder travels through a first slot 722 located in the base of the umbrella valve 708 and through a second slot 724 located underneath the umbrella. Umbrella valve 708 is preferably made of a material which is more rigid when thick and somewhat flexible when thin, such as silicone, so that thin flap 718 is somewhat elastic. When the air pressure underneath the umbrella shape, and therefore the pressure in the bladder of the present invention, reaches a predetermined pressure, thin flap 718 is deformed and lifted off of the sleeve 704. Air is then allowed to escape through holes 716 in the surface portion 738 of cap 710. Dotted line 728 shows the route of air through the release valve portion of combination release valve and check valve 701. When the air pressure in the bladder and under the umbrella becomes less than the predetermined pressure, the thin flap 718 returns to its natural shape an again creating a seal against sleeve 704. The preferred umbrella valve 708, commercially available as VA-3497 Umbrella Check Valve (Part No. VL1682-104) from Vernay Laboratories, Inc. (Yellow Springs, Ohio, USA), typically deforms when the pressure in the bladder is around 5 pounds per square inch. Any other type of umbrella valve, however, would be suitable in the combination check valve and release valve of the present invention, as would be clear to one skilled in the art.

Spring 702, as seen in FIG. 7*c* is in a slightly compressed state such that it holds sleeve 704 firmly and air-tightly against cap 710 so that the only air that may escape is through umbrella valve 704, as describe above. In particular, an air tight seal is formed by the pressure of lip 712 of sleeve 704 against a molded hinge 714 jutting from cap 710. When the surface portion of cap 710 is pressed, cap 710 deforms, as can be seen in FIG. 7*d*. When this occurs the surface portion 738 becomes flat pressing down on an upper rim 742 of sleeve 704. As sleeve 704 is forced downward, spring 702 compresses and lip 712 is pulled away from hinge 714. A gap 726 between hinge 714 and lip 712 allows air to escape out holes 716 in cap 710. Dotted line 729 shows the path of air flow when the release valve portion of combination release valve and check valve is activated. In order to avoid a finger or thumb covering the holes located on the top of cap 710 and preventing the air from escaping through holes 716, an embodiment may include an extension or wall sticking out from the surface portion 738 of cap 710. For example, one embodiment may have a ring-shaped wall (not shown) outside of the holes 716. The ring-shaped wall further has holes in the sides of the wall, such that when a finger or thumb is placed on the ring-shaped wall, the wall pushes down on the cap 710 rather than the finger or thumb. The air that escapes through holes 716 is still trapped by the finger or thumb from the top, but can escape through the holes in the sides of the ring-shaped wall. Another embodiment may have an extension sticking out from the center of surface portion 738. When the extension is depressed, the cap 710 depresses without covering the holes 716. An additional cap may be placed on top of the extension or wall to provide a bigger surface for a finger or thumb to depress the extension or wall. Consequently, the air is allowed to escape from a gap between cap 710 and the additional cap.

FIGS. 8*a*, 8*b* and 9 shows an alternative combination release valve and check valve 801. Combination release valve and check valve 801 is made from a base 806, umbrella valve 808 and cap 810. Therefore, combination release valve and check valve 801 has less pieces and materials and is therefore preferred over combination release valve and check valve shown in FIG. 7. FIG. 8*a* shows a cross section of base 806, umbrella valve 808 and cap 810, wherein the release valve mechanism is not activated. FIG. 8*b* is a detailed view of the portion of combination release valve and check valve 801 that is circled in FIG. 8*a*. Wedge portion 844 is attached to side portion 840 by hinge portion 846. Preferably, cap 810 and base 806 are formed from an injection-molded resin, similar to one or more of those described above, with respect to combination release valve and check valve 701 of FIGS. 7*a*-7*d*. Cap 810 and base 806 may be made from either the same resin or different resins.

Base portion 848 which is in contact with cap portion 842. Base portion 848 and cap portion 842 form an air-tight seal. Preferably, this air tight seal is formed by glueing, bonding, RF welding, heat welding, ultrasonic welding, or another method known to one skilled in the art. Base 806 has a ledge 850 against which wedge portion 844 is pressed when combination release valve and check valve 801 is not activated. Wedge portion 844 and ledge 850 form an air tight seal.

Umbrella valve 808 sits through a hole 830 in base 806, as shown in FIG. 8*a*. Umbrella valve 808 has the general shape of an umbrella and forms an air-tight seal against a top surface 817 of ledge 850. The umbrella-shape is generally thick in the middle but forms a thin flap 818 which rests and forms an air tight seal against top surface 817 of ledge 850. Air from the bladder travels through a slot 822 located along the stem of the umbrella valve 808. Umbrella valve 808 is preferably made of a material which is more rigid when thick and somewhat flexible when thin, such as silicone, so that thin flap 818 is somewhat elastic. When the air pressure underneath the umbrella shape, and therefore the pressure in the bladder of the present invention, reaches a predetermined pressure, thin flap 818 is deformed and lifted off of top surface 817 of ledge 850, similar to the operation of the umbrella valve 708 discussed above with respect to FIGS. 7*a*-7*d*. The air moves from the bladder to the atmosphere out a hole 816 in cap 810 along a dotted line 828. When the air pressure in the bladder and under the umbrella becomes less than the predetermined pressure, the thin flap 818 returns to its natural shape an again creating a seal against base 806. The preferred umbrella valve 708, discussed above with respect to FIGS. 7*a*-7*d* is also the preferred umbrella valve 808 for the combination release valve and check valve 801. Although, many other types of umbrella valve are suitable, as would be clear to one skilled in the art.

One of cap portion 842 or base portion 848 is in contact with the bladder of the present invention depending upon how combination release valve and check valve 801 is integrated with the bladder, as would be apparent to one skilled in the art. Base 806 has holes 820, which allow air to pass from the bladder to an area 853 closed off by wedge portion 844 and ledge 850, along dotted line 856. When the surface portion 838 of cap 810 is pressed, cap 810 deforms, as can be seen in FIG. 9. When this occurs, wedge portion 844 and surface portion 838 act like a lever, such that hinge 846 acts like a fulcrum moving wedge portion 844 away from ledge 850. Dotted line 929 shows the path of air flow out of holes 816 when the release valve portion of combination release valve and check valve 801 is activated. In order to avoid a finger or thumb covering holes 816 located on the top of cap 810 and preventing the air from escaping therethrough, holes 816 may be recessed in cap 810, as shown in FIG. 10. Thus, when surface portion 838 is depressed, fingers do not actually come into contact with holes 816, and air can escape around the finger used to depress cap 810 through channel 1027.

FIGS. 11*a* and 11*b* show yet another combination release valve and check valve 1101, which is a side-by-side valve. In this embodiment, a conventional release valve 1160 is placed side-by-side with an check valve 1108 under a cap 1110 comprising an exit hole 1116. Both check valve 1108 and release valve 1160 are embedded into a base 1106 which communicates with the interior of a bladder. Exit hole 1116 may be located anywhere within cap 1110 because both check valve 1108 and release valve 1160 create air-tight seals with base 1106. Thus, either air will exit out of exit hole 1116 in cap 1110, whether escaping from the check valve 1108 automatically due to pressure in the bladder exceeding a predetermined pressure or escaping from the release valve 1160 due to manual operation thereof.

As seen in FIG. 11b, which is a cross sectional view of combination release valve and check valve 1101, release valve 1160 may have a plunger 1120 and a spring 1122, similar to that described above. However, any release valve, such as those described above, may be used in this embodiment. Similarly, check valve 1108 may be an umbrella valve as described above, with respect to FIGS. 7a-7d, or it may be any other type of check valve 1108.

In other embodiments, combination release valve and check valves, such as those described above, may incorporate an adjustable check valve, such as the adjustable check valve described above with respect to FIG. 1, instead of the umbrella valves shown therein.

As discussed above, an underfoot inflation mechanism may be used in a shoe of the present invention. One way air may enter to the underfoot inflation mechanism is through a hole in heel compartments 308 and 508, as discussed above with respect to FIGS. 3 and 5. Compression of heel compartment 308, 508 seals the hole, such that air is forced into bladder 330, 530. However, sometimes, the materials used to make the sole are not sufficiently breathable to allow air contact to the hole. Further, moisture from the foot may enter into the hole causing damage to the inflation mechanism.

FIG. 12 shows a perspective exploded view of a snorkel assembly 1262. Snorkel assembly 1262 includes a valve chamber 1264, a tube 1266, a cover 1268 and a sole component 1270. Valve chamber 1264 generally is a thermoplastic unit that is adhered over a hole a heel compartment (such as heel chamber 308, 508). Valve chamber 1264 includes a flat portion 1265 that is directly adhered to an exterior or interior surface 1261 of heel compartment 308, 508 via glueing, bonding, RF welding, heat welding, ultrasonic welding, or another other method known to one skilled in the art. Valve chamber 1264 also has a domed portion 1263. Domed portion 1263 is generally a half-cylinder shape with a closed first end 1267 and a second end 1269 comprising an opening 1271.

Since valve chamber 1264 inhibits a seal of the hole in heel chamber 308, 508, valve chamber contains a one-way valve (not shown), such that air will flow through valve chamber 1264 and into a heel chamber without flowing in the opposite direction (i.e., valve will not allow air to escape from a heel compartment. Any type of one-way valve, such as those described in detail above would be suitable for use in valve chamber 1264. One such valve is a duckbill valve, wherein two flexible pieces form a funnel shape. The funnel shape has the two layers open on one end and pressed flat together on the other end, thus closing off the flat end. Air flows from the open end where the pressure is high to the flat end where the pressure is low, so that the flat end opens and the air is forced therethrough. Thus, air will flow in only one direction away from the increase in pressure. Another duckbill valve uses four flexible pieces that come together to form a plus (+) shaped closed end rather than a flat (−) shaped closed end of the duckbill valve described above. The plus-shaped valve allows for greater flow therethrough when opened and does not make as much noise as when air flows through a flat-shaped duckbill valve.

Tube 1266 has a first end 1272 and a second end 1273. Tube 1266 is generally made of a thermoplastic material, such as thermoplastic urethane tubing. Tube 1266 may be rigid or flexible. First end 1272 of tube 1266 is inserted into opening 1271 in valve chamber 1264 and forms an air tight seal therewith. Tube has a generally J-shape and curves along the outside of a bladder (such as bladder 330, 530). Second end 1273 is held against the outside of bladder by cover 1268. Cover 1268 is a thermoplastic formed piece having a flat portion 1274 and a dome portion 1275. Flat portion 1274 is adhered to the outside of the bladder via glueing, bonding, RF welding, heat welding, ultrasonic welding, or another other method known to one skilled in the art. Alternatively, cover 1268 may have a backing adhered to flat portion 1274 on a first side and the outside of bladder on a second side. Preferably, flat portion 1274 is adhered to an outside of the upper in the general vicinity of fluid connection junctions (such as fluid conjunctions 358 and 558 of FIGS. 3 and 5, respectively), such as in heel area 108 of FIG. 1. Dome portion 1275 is generally a half-cylinder shape with a closed first end 1276 and a second end 1277 open to receive second end 1273 of tube 1266. Cover 1268 also has one or more openings 1278 along the cylindrical part of dome portion 1275. Having openings 1278 on a generally vertical part of the shoe allows air to enter dome portion 1275, but keeps out dirt and moisture that may cause damage to the inflation mechanism. Thus, when there is a low pressure inside a heel compartment, air will flow into heel chamber via snorkel assembly 1262. In particular, air will flow into cover 1268 through openings 1278, through tube 1266 from second end 1273 to first end 1272, through valve chamber 1264 and a valve housed therein and into a heel compartment. In another embodiment, second end 1273 of tube 1266 may have a butterfly valve or other valve inside cover 1268 for additional protection of the inflation mechanism.

Snorkel assembly 1262 also has a sole component 1270. Sole component 1270 may be a midsole, an outsole, a thermoplastic plate or another part of a shoe sole, as are known to those skilled in the art. The sole component 1270 has a cavity 1280 therein. When sole component 1270 is adhered to a bladder, a heel compartment rests at least partially within cavity 1280. Cavity 1280 further has a recess 1282 into which valve chamber 1264 is inserted. Sole component 1270 also has a recess 1284 into which tube 1266 is inserted when the shoe is assembled. The snorkel assembly 1262 of the present invention is particularly described with respect to heel compartments 308, 508 of FIGS. 3 and 5, respectively. However, one skilled in the art can appreciate that snorkel assembly 1262 is appropriate for use with any underfoot inflation mechanism, such as those described with respect to further embodiments discussed below, or any other kind of inflation mechanism.

FIG. 13 show yet another embodiment of the present invention. Shoe 1300 has a heel area shown generally at 1308, an arch area shown generally at 1303, a vamp area shown generally at 1305, a forefoot area shown generally at 1304, and a lateral side area generally shown at 1306. Shoe 1300 also includes a sole 1320 and an upper 1310 of which at least a portion entirely comprises an inflatable bladder 1330. In addition, upper 1310 of FIG. 1 has a toe portion 1334. As demonstrated in FIG. 13, bladder 1330 may form all portions of upper 1310, including toe portion 1334. Upper 1310 has an opening shown generally at 1312, which is designed to receive a wearer's foot.

Upper 1330 is formed from bladder 1330. Bladder 1330 is generally formed in the same manner described above with respect to the bladders of FIGS. 2, 3 and 5. However, air flows through bladder 1330 within generally cross-hatched channels 1382 formed by generally diamond shaped openings 1384 in bladder 1330. Openings 1384 are generally made in the same way as pockets 532 and 534 as describe above with respect to FIG. 5. In other words, interior weld lines 1386 are formed in a closed diamond shape and the material inside of interior weld line 1386 is removed forming an opening 1384. Openings 1384 are particularly useful for cooling and drying the foot as synthetic material, such as polyurethane films, may cause the foot to generate moisture in the shoe.

Bladder 1330 generally has a deflation mechanism 109, which may be any of the deflation mechanisms discussed above, or another deflation mechanism that would be apparent to one skilled in the art. Further, bladder 1330 may have any type of inflation mechanism discussed above. Preferably, however, the inflation mechanism is an under foot inflation mechanism, similar to that described above with respect to FIGS. 3 and 5 and discussed further with respect to FIGS. 14-16.

FIG. 14 is generally a top plan view of a bladder 1430 that is similar to bladder 1330 shown in FIG. 13. Bladder 1430 includes an interior layer and an exterior layer of a thin film that are attached by a periphery weld line 1410 that surrounds bladder 1430. Bladder 1430 of FIG. 14 is constructed by stitching, or otherwise attaching, a first area 1489 of periphery weld line 1410 to a second area 1490 of periphery weld line 1410. Also, a third area 1491 of periphery weld line 1410 is stitched, or otherwise attached, to a fourth area 1492 of periphery weld line 1410 to form a left boot which surrounds most of the foot of the wearer. One skilled in the art can appreciate that a mirror image of bladder 1430 may be used to form a right boot.

Bladder 1430 comprises a vamp compartment 1453, a medial heel compartment 1458, and a heel compartment 1460. Vamp compartment 1453 is generally the largest compartment and provides cushioning to the medial side area 1488, vamp area 1305, lateral side area 1306 and a portion of heel area 1308. Vamp compartment 1453 is fluidly connected to medial heel compartment 1458 via fluid connection junction 1474. Medial heel compartment 1458 also provides cushioning to a portion of heel area 1308 and is fluidly connected to heel compartment 1460 via fluid passageways 1472 and 1473. Heel compartment 1460 provides cushioning to the heel of the foot and is preferably used as an inflation mechanism, as described in detail with respect to FIGS. 3 and 5. Bladder 1430 also has a deflation mechanism 109, as shown in a location of vamp area 1305 in FIG. 14. As discussed above, deflation mechanism 109 may be any deflation mechanism described above and may be located in any position on bladder 1430. Thus, in a typical gait cycle when the heel of the foot compresses heel compartment 1460, air will move out of heel compartment 1460, through a one-way valve 1480 and fluid passageways 1472 and 1473 into medial heel chamber 1458. From medial heel chamber 1458 fluid will move through fluid connection junction 1474 to inflate vamp compartment 1453. As air enters bladder 1430, the bladder may constrict around opening 1312, which operates as a closure for the shoe, such that laces, zippers, hook and pile or other closure system are not necessary.

As discussed above with respect to FIG. 13, vamp compartment 1453 and medial heel compartment 1458 have openings 1384 foamed by interior weld lines 1386. FIG. 14 shows only the approximate locations of interior weld lines 1386. Openings 1384 can be of various sizes by making interior weld lines 1386 bigger or smaller in shape or by increasing or decreasing the widths of interior weld lines 1386. In addition to sizes, the locations, numbers and shapes of openings 1384 may be varied. Openings 1384 are spaced such that the inflatable area between them forms cross-hatched channels 1382. Further, the width of periphery weld lines 1410 may be larger or smaller than that shown in FIG. 14.

Bladders 1330 and 1430 as shown in FIGS. 13 and 14, respectively, make up almost all of upper 1310. However, FIGS. 15 and 16 show the top plan views of bladders 1530 and 1630 respectively that constitute a smaller portion of an upper. Thus, forefoot area 1304 is not covered by bladders 1530 and 1630 when they are fully assembled into a shoe. Vamp compartments 1553 and 1653, respectively, are shown in various sizes. In particular, vamp compartment 1553 of bladder 1530 is smaller than vamp compartment 1453 of bladder 1430. Thus, a shoe having bladder 1530 has less of the upper made from a bladder than a shoe having bladder 1430, as shown in FIG. 14. Similarly, vamp compartment 1653 of bladder 1630 is smaller than vamp compartment 1553 of bladder 1530. Thus, a shoe have bladder 1630 has less of the upper made from a bladder than a shoe having bladder 1530. However, medial heel compartment 1558, 1658 and heel compartment 1560, 1660 if FIGS. 15 and 16 are similar to medial heel compartment 1458 and heel compartment 1460 described above with respect to FIG. 14. FIGS. 15 and 16 show the preferred width of the interior weld lines 1586 and 1686, although interior weld lines 1586 may be a variety of widths, shapes and sizes. FIG. 17 is a photograph of a lateral side of a shoe 1700 which has a bladder 1730 similar to the bladder shown in FIG. 15. As discussed above, bladders of the present invention may be made of thin polyurethane film. The bladder in FIG. 17, however, is made from a metallized polyester film, such as MYLAR® (available from Dupont Teijin Films, Wilmington, Del.) or another thin, light weight polyester film. MYLAR® is particularly suited to be used in a bladder of the present invention because it has great strength in a very thin film. In addition, polyester films, such as MYLAR® are air-tight, tear-resistant and puncture resistant. Further, polyester films may be printed, embossed, dyed, clear, colored or metallized, which provides a variety of styles for a single shoe design. A bladder may be made from layers of polyester film has periphery and interior weld lines generally formed by heat sealing, or other such processes similar to those used in sealing packages in the food industry and/or the MYLAR® balloon industry. However, weld lines may also be made using any other method of forming an air tight seal with a polyester film, as would be known to those skilled in the art. Alternatively, the polyester film may be a composite of polyester film and urethane filaments or a very thin layer of polyurethane film, particularly for the formation of air tight seals around inflation and deflation mechanisms and components thereof. A polyester and polyurethane composite also has increase tear-resistance with the benefits of the lightweight nature of the polyester film.

Shoe 1700 is shown with openings 1784 cut inside interior weld lines 1786 to allow air to circulate through the shoe. Although openings are generally diamond-shaped in FIGS. 13-17, openings may be circular, square, oval, or any other closed regular or irregular shape. Thus, interior weld lines that form openings 1384/1784 can have an equal variety of shapes. In addition, openings 1384/1784 may vary in size and shape within various locations over the upper, as shown in FIGS. 13-17.

FIG. 18 shows another embodiment of the present invention in shoe 1800. FIG. 18 is a lateral view of shoe 1800. A medial side of shoe 1800 is similar in form. Shoe 1800 has an upper 1810 that includes a first bladder 1830a and a second bladder 1830b. First bladder 1830a is generally located in a vamp area 1805, and second bladder 1830b is generally located in a heel area 1808. A third bladder (not shown) is an underfoot inflation mechanism located substantially under the heel, as described above with respect to heel compartments 308, 508, 1460, 1560, and 1660 above. However, first and second bladders 1830a and 1830b are not manufactured as a single unit with the heel compartment in the embodiment shown in FIG. 18. Instead, the heel compartment is fluidly connected with first bladder 1830a via tubes 1890, and first bladder 1830a is fluidly connected with second bladder 1830b via tube 1891. In the embodiment shown in FIG. 18, tube 1891 is redirected through redirectional device 1892 between first and second bladders 1830a and 1830b. Although not shown in FIG. 18, a medial side of shoe 1800 would have tubes similar to tubes 1890 and 1891, such that the combination of bladders 1830a, 1830b and tubes 1890 and 1891 form an opening 1812 for a foot.

As a typical gait cycle occurs, air flows from the heel compartment through tubes 1890 into first bladder 1830a and from first bladder 1830a to second bladder 1830b through tube 1891. When inflated first and second bladders 1830a and 1830b close around an inserted foot such that laces or another closure system is not necessary.

Tubes 1890 and 1891 are fluidly connected to first and second bladders 1830a and 1830b via tube connections 1894. Tube connectors 1894 are thermoplastic cases that are fluidly connected to a hole in first or second bladder 1830a, 1830b. The tube connectors 1894 have a flat portion 1865 that is directly adhered to an exterior or interior surface of bladders 1830a and 1830b, depending on how tube connectors are integrated with bladders 1830a and 1830b as would be apparent to one skilled in the art. Tube connectors 1894 may be adhered via glueing, bonding, RF welding, heat welding, ultrasonic welding, or another other method known to one skilled in the art, forming an air-tight seal therewith. Tube connector 1894 also has a domed portion 1896. Domed portion 1896 is generally a half cylinder-shape with a closed first end 1897 and a second end 1898 comprising an opening, into which tube 1890 or tube 1891 is inserted. Tubes 1890 and 1891 and tube connectors 1894 form an air-tight seal such that air cannot escape where tubes are connected to first and second bladders 1830a and 1830b. In an alternate embodiment, air may flow from the heel compartment directly to second bladder 1830b. For example, tube 1891 could be two tubes 1891a and 1891b which are each connected to the heel compartment. Tubes 1890 and 1891 may be thermoplastic urethane or other thermoplastic tubing, and may be flexible or inflexible. Tubes 1890 extend into the sole 1820 of the shoe 1800. Shoe 1800 also includes a hard thermoplastic shank 1893, in which channels 1893a have been formed to receive tubes 1890 and direct them towards the heel compartment, to which they are fluidly connected under the foot of the wearer. FIG. 18 also shows a tube 1866 and cover 1868 of a snorkel assembly, such as that described above with respect to FIG. 12, so that air can reach the heel compartment without a buildup of moisture in the inflation mechanism. Further, the embodiment of the present invention shown in FIG. 18 may include any of the deflation devices discussed above, e.g., one of the combination release valve and check valve described above.

FIGS. 19a and 19b show one embodiment of a heel compartment assembly 1901, suitable to be used in the sole 1820 of shoe 1800 of FIG. 18. Heel compartment 1960 is fluidly connected to a plurality of tubes 1990 through a channel 1999. Channel 1999 is fluidly connected to heel compartment 1960 via a one way valve 1995. FIGS. 19a and 19b also show a valve chamber 1963 and a tube 1966 of a snorkel assembly 1962 as described above with respect to FIG. 12. Channel 1999 and heel compartment 1960 may be made by two or more layers of a flexible polyurethane film. Heel compartment 1960 may also comprise a polyurethane foam core, similar to that described above with respect to FIG. 5. Further, the embodiment of the present invention shown in FIG. 19 may include any of the deflation devices discussed above, e.g., one of the combination release valve and check valve described above.

Tubes 1990 are welded along with the film layers at a periphery weld line 1910 creating an air-tight seal around tubes 1990. Channel 1999 further has welds 1970. Welds 1970 are used to control the thickness of the channel 1999 when air is moving through it, and they help direct the flow of air into tubes 1990. Periphery weld line 1910 and welds 1970 may be formed by RF welding, heat welding, ultrasonic welding or by other suitable means.

FIG. 20 shows another shoe 2000 of the present invention which also uses a heel compartment assembly as shown in FIGS. 19a and 19b. Shoe 2000 is similar to shoe 1800, except that bladder 2030 is one piece. Bladder 2030 is fluidly connected to tubes 2090 via tube connectors 2094. Tube connectors 2094 have flat portions 2065 that are directly adhered to an exterior or interior surface of bladder 2030 via glueing, bonding, RF welding, heat welding, ultrasonic welding, or another other method known to one skilled in the art, forming an air-tight seal therewith. Tube connectors 2094 also have domed portions 2096. Domed portions 2096 are generally a half-cylinder shape with a closed first end 2097 and a second end 2098 comprising an opening, into which tube 2090 is inserted. Tubes 2090 and tube connector 2094 form an air-tight seal such that air cannot escape where tubes 2090 are connected to bladder 2030. As a typical gait cycle occurs, air flows from the heel compartment (not shown) through tubes 2090 into bladder 2030. When inflated bladder 2030 closes around an inserted foot such that laces or another closure system is not necessary. Shoe 2000 also incorporates a shank 2093, which is formed with cavities 2093a for receiving tubes 2090. Shank 2093 may be a molded thermoplastic piece, a shaped metal plate, a midsole foam piece, or another other structure that would be apparent to one skilled in the art. Tubes 2090 are fluidly connected with the heel compartment under the foot of the wearer, such as described above with respect to FIG. 19. Further, the embodiment of the present invention shown in FIG. 18 may include a snorkel assembly, such as that described above with respect to FIG. 12 and/or any of the deflation devices discussed above, e.g., one of the combination release valve and check valve described above.

Bladder 2030 may be connected to heel compartment via tubes 2090, as shown in FIG. 20. Alternatively, bladder 2030 and an underfoot inflation mechanism located either in the forefoot area or in the heel area may be formed as a unitary construction. One possible construction would be similar to that of shoe 2100 shown in FIG. 21.

FIG. 21 shows an exploded view of a shoe construction of shoe 2100 of the present invention. Bladder 2130 has two underfoot sections, a forefoot compartment 2164 and a heel compartment 2160. Either forefoot compartment 2130 or heel compartment 2160 may be an inflation mechanism, preferably heel compartment 2160, for inflating the remaining compartments of bladder 2130. Bladder 2130 is bonded to two outsole pieces 2120a and 2120b, via glueing or other type of adhesive. Outsole piece 2120a is bonded to heel compartment 2160, and outsole piece 2120b is bonded to forefoot compartment 2164. A portion of shank 2193 is bonded to both outsole pieces 2120a and 2120b and overlaps bladder 2130. Shank 2193 is used to provide support between the outsole pieces 2120a and 2120b. An optional midsole 2155 may be included over bladder 2130. Midsole 2155 may have indentations 2155a which receive and may be bonded to the interior of upper 2110. Additional, upper material (not shown) may be stitched to bladder 2130 and bonded to midsole 2155, particularly in toe area 2104. Additional material provides protection from the elements for an inserted foot where bladder 2130 does not cover the foot. Shoe 2100 may also have a sockliner 2123 above the midsole or above shank 2193. Other parts of shoe 2100 not shown may include a snorkel assembly as described with respect to FIG. 12, as well as other features that provide stability and protection to a wearer's foot.

FIG. 22 shows another shoe 2200 which incorporates the heel compartment assembly 1901 shown and described with respect to FIGS. 19a and 19b as an underfoot inflation mechanism. Shoe 2200 comprises a conventional upper 2210 and a plurality of flexible, inflatable tubes 2290. When inflated, tubes 2290 expand and close around an inserted foot as inflatable laces, such that conventional laces or another closure system is not necessary. To remove shoe 2200 a deflation device (not shown) in fluid connection with tubes 2290, such as those discussed above, is activated releasing air from and collapsing tubes 2290. The deflation device may be any of the deflation devices discussed above, e.g., one of the combination release valve and check valve. Tubes 2290 are fluidly connected to a channel 1999 (as shown in FIG. 19) at both ends, forming a loop over upper 2210. As the wearer applies pressure to a heel compartment assembly, tubes 2290 inflate. FIG. 22 shows five tubes 2290 extending across a vamp area 2205 of shoe 2200 and three tubes 2290 extending across a heel area 2208. One skilled in the art can appreciate that more or less tubes 2290 may be used on shoe 2200. For example, shoe 2200 may have only one tube extend across each of the vamp area 2205 and heel area 2208. Alternatively, shoe 2200 may have no tubes in the heel area and only tubes in the vamp area, or vice-versa, provided that tubes 2290 when inflated help cushion and secure a foot inside shoe 2200.

Shoe 2200 also has a shank 2293 with cavities 2293a for receiving tubes 2290. Shank 2293 provides shoe 2200 with support and structure. Shoe 2200 may also have a covering layer of material (not shown) over tubes 2290.

Each of the shoes described above may include a sockliner, such as sockliner 2123 shown in FIG. 21. However, the same underfoot inflation mechanism described above may also be used in an inflatable sockliner. An overhead plan view of inflatable sockliner 2323 is shown in FIG. 23. Sockliner 2323 may also be made from two layers of a polyurethane film bonded by glueing, bonding, RF welding, heat welding, ultrasonic welding, or another other method known to one skilled in the art for forming an air-tight seal. Sockliner 2323 is generally defined by a periphery weld line 2310 and includes various compartments defined by both periphery weld line 2310 and various shaped interior weld lines 2320.

Sockliner 2323 has a heel compartment 2360 with a hole 2361 allowing air to enter heel compartment 2360. When hole 2361 is covered, and pressure is applied to heel compartment 2360, air is forced through one-way valve 2350 into a plurality of medial compartments 2354. Medial compartments 2354 are fluidly connected to a plurality of forefoot compartments 2364. Forefoot compartments 2364 are fluidly connected to a plurality of first phalanx compartments 2351 and a plurality of second through fifth phalax compartments 2353. Forefoot compartments 2364 are also fluidly connected to a plurality of lateral compartments 2356. The various comparts shown in FIG. 23 are designed to have the general shape of the foot of the wearer. However, more or less compartment and alternatively shaped compartments are suitable for a sockliner of the present invention.

Sockliner 2323 uses a perforation deflation mechanism described above. Preferably, sockliner 2323 has at least one perforation 2309, the location of which is shown in FIG. 23 by crossed lines. The material used to make sockliner 2323 may be of a flexible material such that perforation 2039 will generally remain closed. If the pressure in the sockliner 2323 becomes greater than a predetermined pressure the force on the sides of the sockliner 2323 will open perforation 2309 and air will escape. Since sockliner 2323 is inserted into the interior of a shoe, it will not be necessary for the wearer to have access to a deflation device within the shoe to avoid overinflation of sockliner 2323. However, one skilled in the art can appreciate that another deflation mechanism may be incorporated into sockliner 2323. Further, sockliner 2323 may have a snorkel assembly similar to that discussed in FIGS. 19a and 19b for introducing air into or out of sockliner 2323.

Sockliner 2323 may be removable or may be permanently inserted into the shoe during manufacture thereof. Further, sockliner 2323 may be used in any shoe of the present invention or in any conventional athletic, walking or hiking shoe or boot.

While the invention has been particularly shown and described with reference to preferred embodiments thereof, it will be understood by those skilled in the art that they have been presented by way of example only, and not limitation, and various changes in form and details can be made therein without departing from the spirit and scope of the invention. For example, any of the bladders of the present invention may be pre-inflated at the factory. A bladder of this type would not require an inflation mechanism or a deflation valve. Further, laces or another closure system may be incorporated into any shoe design of the present invention.

Thus, the breadth and scope of the present invention should not be limited by any of the above-described exemplary embodiments, but should be defined only in accordance with the following claims and their equivalents. Additionally, all references cited herein, including issued U.S. patents, or any other references, are each entirely incorporated by reference herein, including all data, tables, figures, and text presented in the cited references.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

What is claimed is:

1. An article of footwear, comprising:
    a sole; and
    an upper attached to said sole having at least one polymer layer forming an exterior surface of the upper, the at least one polymer layer having a plurality of hollow intersecting segments forming a plurality of apertures.

2. The article of footwear of claim 1, wherein the segments comprise hollow channels.

3. The article of footwear of claim 1, wherein the segments comprise air-filled channels.

4. The article of footwear of claim 3, wherein the segments are configured to allow air to flow within the segments.

5. The article of footwear of claim 1, wherein the polymer layer comprises a flexible material.

6. The article of footwear of claim 1, wherein the polymer layer comprises a non-stretchable material.

7. The article of footwear of claim 1, wherein the polymer layer comprises a thin film.

8. The article of footwear of claim 1, wherein the polymer layer forms a portion of an exterior surface of the upper in a forefoot region of the upper.

9. The article of footwear of claim 1, wherein the polymer layer forms a portion of an exterior surface of the upper in a midfoot region of the upper.

10. The article of footwear of claim 1, wherein the polymer layer forms a portion of an exterior surface of the upper in a heel region of the upper.

11. The article of footwear of claim 1, wherein the polymer layer forms a portion of an exterior surface of the upper in a forefoot region, a midfoot region, and a heel region of the upper.

12. The article of footwear of claim 1, wherein the polymer layer comprises a bladder.

13. The article of footwear of claim 12, wherein the bladder surrounds each aperture.

14. The article of footwear of claim 12, wherein a weld line surrounds a periphery of an aperture.

15. The article of footwear of claim 1, wherein the plurality of apertures are formed in at least one of a heel portion, a midfoot portion, and a forefoot portion of the exterior surface of the upper.

16. The article of footwear of claim 1, wherein the plurality of apertures are substantially quadrilateral shaped.

17. The article of footwear of claim 1, wherein the plurality of apertures are substantially diamond shaped.

18. The article of footwear of claim 1, wherein the polymer layer comprises an interior layer portion and an exterior layer portion, and
  wherein the exterior layer portion comprises a laminate of a polymer film and a fabric.

19. The article of footwear of claim 1, wherein the area of the exterior surface of the polymer layer is greater than the area defined by the plurality of apertures.

20. An article of footwear, comprising:
  a sole;
  an upper attached to said sole, wherein said upper comprises a plurality of hollow intersecting segments,
  wherein the plurality of hollow intersecting segments form a plurality of apertures.

21. The article of footwear of claim 20, wherein the plurality of hollow segments is distinct from, and coupled to, the sole.

22. An article of footwear, comprising:
  a sole portion;
  an upper having a top edge portion;
  a first plurality of hollow segments extending from the sole portion to the top edge portion; and
  a second plurality of hollow segments extending from the sole at oblique angles with respect to the first plurality of hollow segments,
  wherein the second plurality of hollow segments intersects with the first plurality of hollow segments to define a plurality of apertures therebetween.

23. The article of footwear of claim 22, wherein the hollow segments of the first and second pluralities of hollow segments are substantially linear.

* * * * *